United States Patent [19]

Woodley

[11] Patent Number: 4,486,262

[45] Date of Patent: Dec. 4, 1984

[54] CASSETTE LOADING MACHINE

[75] Inventor: George M. Woodley, Shrewsbury, Mass.

[73] Assignee: King Instrument Corporation, Westboro, Mass.

[21] Appl. No.: 433,814

[22] Filed: Oct. 12, 1982

[51] Int. Cl.$^3$ .............................................. B65H 21/00
[52] U.S. Cl. .................... 156/502; 156/505; 156/569; 242/56 R; 242/58.1
[58] Field of Search ............... 156/505, 506, 502, 569, 156/558, 559; 242/56 R, 58.4, 58.1

[56] References Cited

U.S. PATENT DOCUMENTS

| | | | |
|---|---|---|---|
| 3,940,080 | 2/1976 | Bennett | 242/56 R |
| 4,062,719 | 12/1977 | Masuzima et al. | 156/506 |
| 4,264,402 | 4/1981 | Morgan | 156/505 |
| 4,328,065 | 5/1982 | Kincheloe et al. | 156/505 |
| 4,332,355 | 6/1982 | Zopfy et al. | 242/56 R |

*Primary Examiner*—Michael G. Wityshyn
*Attorney, Agent, or Firm*—Schiller & Pandiscio

[57] ABSTRACT

An improved cassette storing, feeding and handling mechanism is provided for a machine for loading magnetic tape into C-Zero video tape cassettes. The machine is of the type having a tape loading cycle which includes cutting the cassette leader into two sections, splicing one leader section to the end of a supply of magnetic tape, winding the one leader section and a predetermined length of magnetic tape into the cassette, severing the magnetic tape, and splicing the trailing end of the tape wound into the cassette to the second leader section. The improved mechanism comprises a magazine adapted to store C-Zero cassettes, means for feeding cassettes one at a time from the magazine, a cassette carrier, guide means for guiding cassettes fed from said magazine to said carrier, means for reciprocating the cassette carrier from a first cassette receiving position to a preselected cassette loading position, means for holding a C-Zero cassette in said loading position for the duration of a loading cycle and then discharging the loaded cassette. The improved mechanism also may include means for assuring that a cassette is properly positioned on the carrier and means for accumulating a selected number of cassettes and discharging them as a group to a receiver or conveyor. The mechanism is arranged so that it may be easily adapted for handling two different types of video cassettes.

33 Claims, 32 Drawing Figures

CASSETTE LOADING MACHINE

This invention relates to machines for splicing and winding tapes and in particular to machines for loading a length of flexible information recording material into a cassette. While the invention was made to facilitate the loading of magnetic tape, other use tapes such as strips of photographic film may be loaded into cassettes with this invention.

BACKGROUND OF THE INVENTION

A variety of magnetic tape cassettes have been developed which employ two rotatable hubs or spools with magnetic tape connected to both hubs and wound upon one or both hubs. Usually the cassette includes sections of a leader tape attached to each spool or hub, with the magnetic tape having its opposite ends spliced to the two leaders. Cassettes of this type have been developed for both audio and video magnetic tape. Magnetic tape cassettes of the audio type are generally shown in U.S. Pat. Nos. 3,423,038, 3,753,835, 3,797,770, 3,167,267, and 4,062,719. Video cassettes are more complicated than audio cassettes and generally have a door which is normally closed to conceal the magnetic tape and leader. When the video tape cassette is to be used, the door is opened so as to allow the tape to be transported past the Read and Write magnetic heads of a VCR (video tape cassette recorder) machine.

Two types of VCR machines have achieved substantial commercial success. One type, known as the VHS format machine, uses a cassette having a pivoted door along one side, first releasable door locking means at a first side of the cassette body for keeping the door locked, and second releasable hub locking means for preventing rotation of the cassette hubs. The second type of commercially successful VCR machine, known as the Betamax format machine, uses a cassette which is similar to the VHS cassette but differs in size, has its door locking means located at the second or opposite side of the cassette, and has a hub locking mechanism which is unlocked with the door.

Cassettes loaded with a selected amount of magnetic tape are generally manufactured in one of two ways. The first, commonly called "hub loading", involves starting with two hubs and a length of leader tape secured to and extending between the two hubs, severing the leader tape into two sections, splicing magnetic tape to the leader section connected to a first one of the two hubs, winding a selected length of magnetic tape onto that first hub, splicing the trailing end of the magnetic tape to the leader section connected to the second hub, and then inserting the two hubs into a cassette body. The second common method is to load magnetic tape directly into a C-Zero cassette. A "C-Zero cassette" is one which consists of a cassette body, two hubs rotatably mounted in the cassette body, and a length of leader tape connecting the two hubs. This type of cassette loading, commonly called "in-cassette loading", also involves cutting the leader tape to form two discrete leaders, splicing one end of a magnetic tape to the leader connected to a first cassete hub, winding magnetic tape onto the first hub, and splicing the trailing end of the magnetic tape to the second leader section. Where in-cassette loading is the practice, the procedure further involves the additional step of slowly winding the trailing end of the magnetic tape into the cassette after the second splice has been made, so that the magnetic tape and the trailing leader are fully pulled into the cassette.

The design of machines for accomplishing in-cassette loading of video tape cassettes has been hampered by a number of factors or requirements which include the following: (1) VHS and Betamax cassettes have leaders which are relatively short and differ in length, (2) VHS and Betamax cassettes are of different size and employ different locking mechanisms, (3) the splicing tape must be applied to the inner surface of the leader when making a splice, (4) manufacturers of video cassettes may require that the length of the leader at one or both ends of the the magnetic tape be within certain prescribed limits, (5) because of the relatively high cost of video tape cassettes, manufacturers are concerned about the cosmetic appearance of the cassettes and are unwilling to utilize loading machines which may damage the exterior appearance of the cassette, provide uneven loading of magnetic tape, or damage the tape. As a result state of the art in-cassette video tape loading machines suffer from one or more of the following limitations: (a) they are capable of loading only one type of cassette and hence two different machines are required to be purchased for loading VHS and Betamax cassettes, (b) relatively low production rates, (c) slow and complicated means for extracting the leader from a cassette and placing it in position to be cut and spliced to the magnetic tape which is to be loaded into the cassette, (d) various tape-handling components are spread apart from one another to an extent that causes the machines to be relatively large and slow, (e) relatively large cost, and (f) slow and cumbersome cassette storing and feeding mechanisms due to concern about preventing damage to the cassettes.

Still other disadvantages, problems and limitations of existing in-cassette video tape loading machines are well known to persons skilled in the art.

SUMMARY OF THE INVENTION

The primary object of this invention is to provide a new and improved automatic winding machine which includes a novel cassette storing and feeding mechanism and avoids many of the foregoing drawbacks of prior in-cassette loading machines.

A more specific primary object of this invention is to provide an automatic cassette loading machine having improved means for (a) holding a plurality of cassettes to be loaded, (b) moving the cassettes one at a time on command to a predetermined forwarding position, and (c) means for holding each cassette in loading position and releasing said each cassette after it has been loaded with a predetermined amount of a use tape such as magnetic tape.

A further object is to provide a machine of the type described which has means for feeding empty cassettes from a storage magazine to a preselected loading position quickly and efficiently and without damaging the cassette. Another object is to provide an in-cassette tape loading machine having novel means for holding an empty cassette in loading position.

Still another object is to provide a machine having novel means for unlocking the door of a cassette in loading position. A further object is to provide an in-cassette tape loading machine having novel means for receiving and stacking loaded cas- settes.

These and other objects are achieved by providing a machine having a front panel, a splicing block assembly comprising first and second splicing blocks, a support for said blocks on said panel, means for moving one block relative to the other on said support, means for pivoting said support as a unit about an axis fixed relative to the panel, a magazine for holding a supply of cassettes to be loaded, feeding means for feeding cassettes from said magazine and delivering them one at a time to a predetermined loading position adjacent to said splicing block assembly, said feeding means comprising a first stage characterized by reciprocating means for discharging cassettes one at a time from said magazine, and a second stage characterized by a reciprocating cassette carrier for conveying cassettes to said loading position, means for holding a cassette conveyed by said carrier in said loading position adjacent to the splicing block assembly and discharging the cassette after it has been loaded, a splicer mounted to said panel in front of said splicer block assembly, a rotatable supply reel spindle adapted to support a reel of a selected use tape, a first motor for rotating said supply reel spindle so as to feed tape to a cassette in loading position, means for selectively operating said first motor, a takeup spindle movable into and out of engagement with one of the two hubs of a cassette in loading position, a second motor for rotating said takeup spindle so as to rotate said one hub, and selectively operable means for energizing said second motor so as to wind use tape onto said one hub.

Other objects, features and advantages of the invention are described or render obvious in the following detailed specification which is to be considered together with the accompanying drawings wherein like numerals indicate like parts.

THE DRAWINGS

Figure 24:
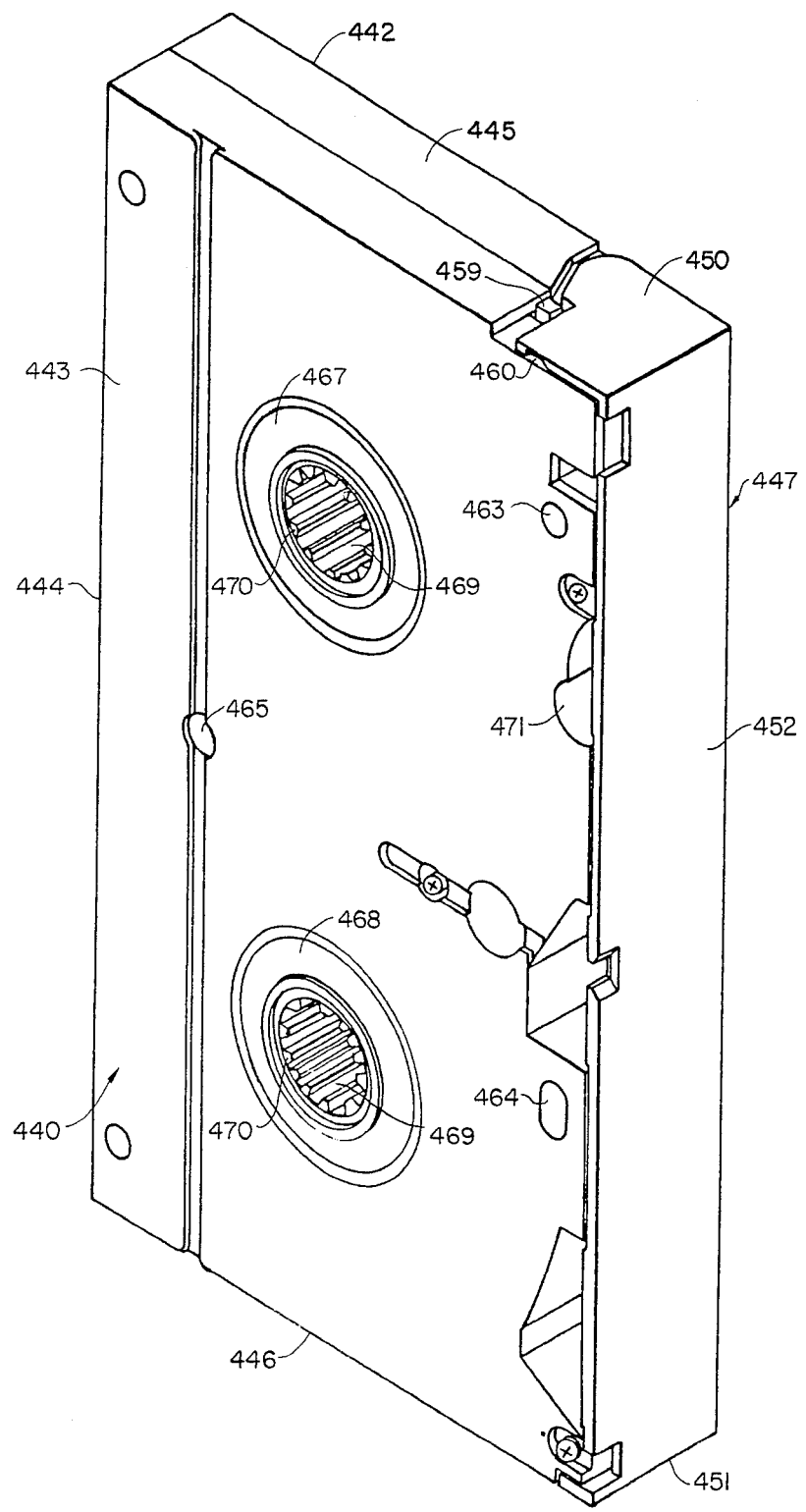
FIG. 24 is a perspective view of the rear side of a VHS cassette with its door closed.
Figure 25:
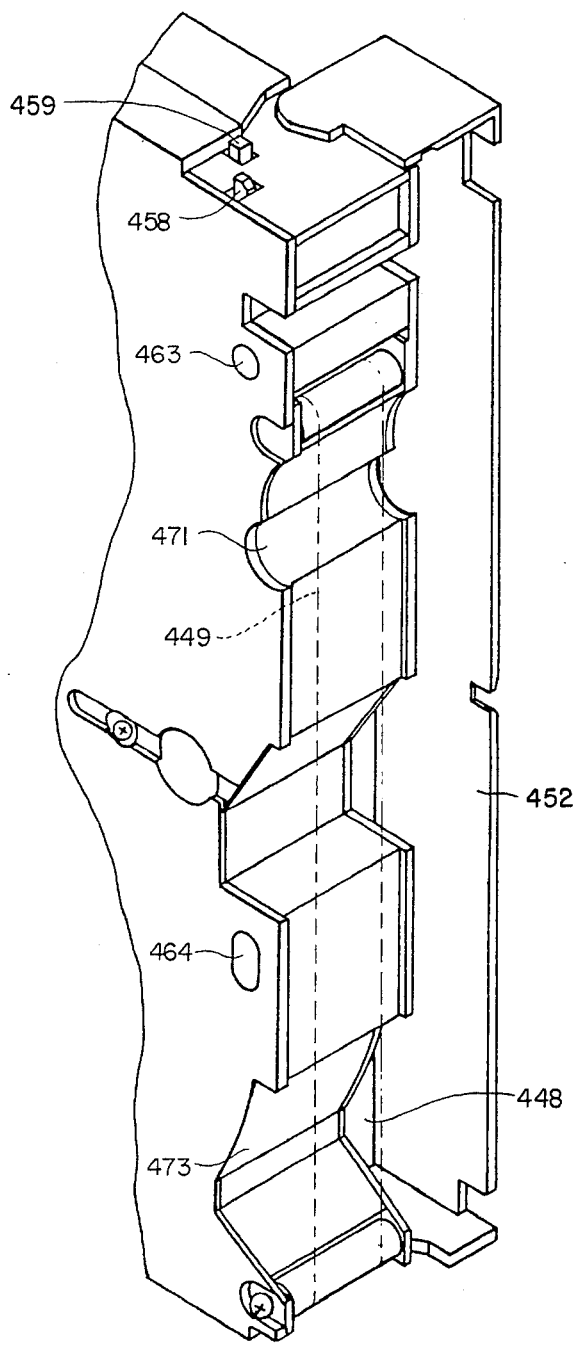
FIG. 25 is a fragmentary perspective view showing the same cassette with its door opened.
Figure 28:
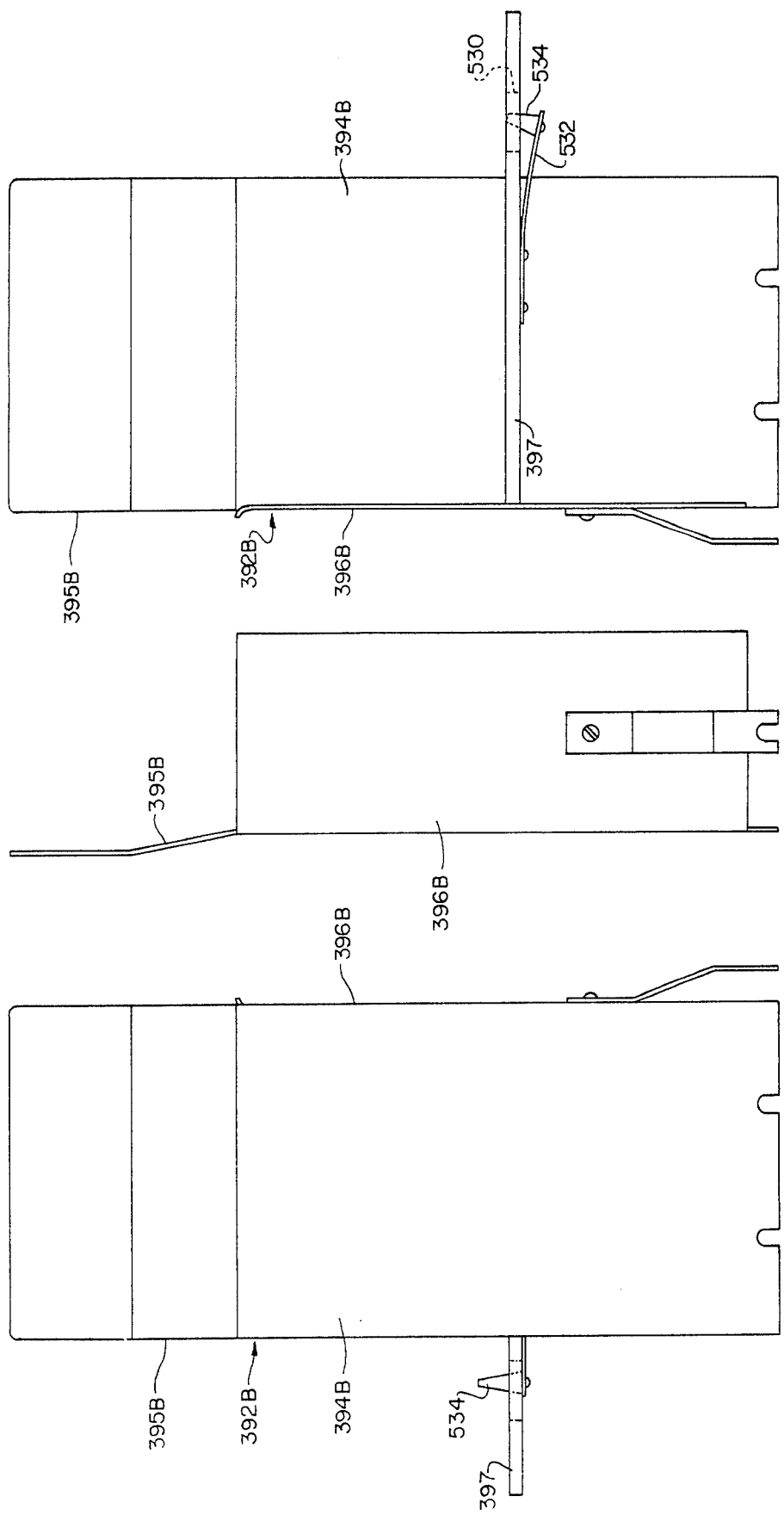
Figure 29:
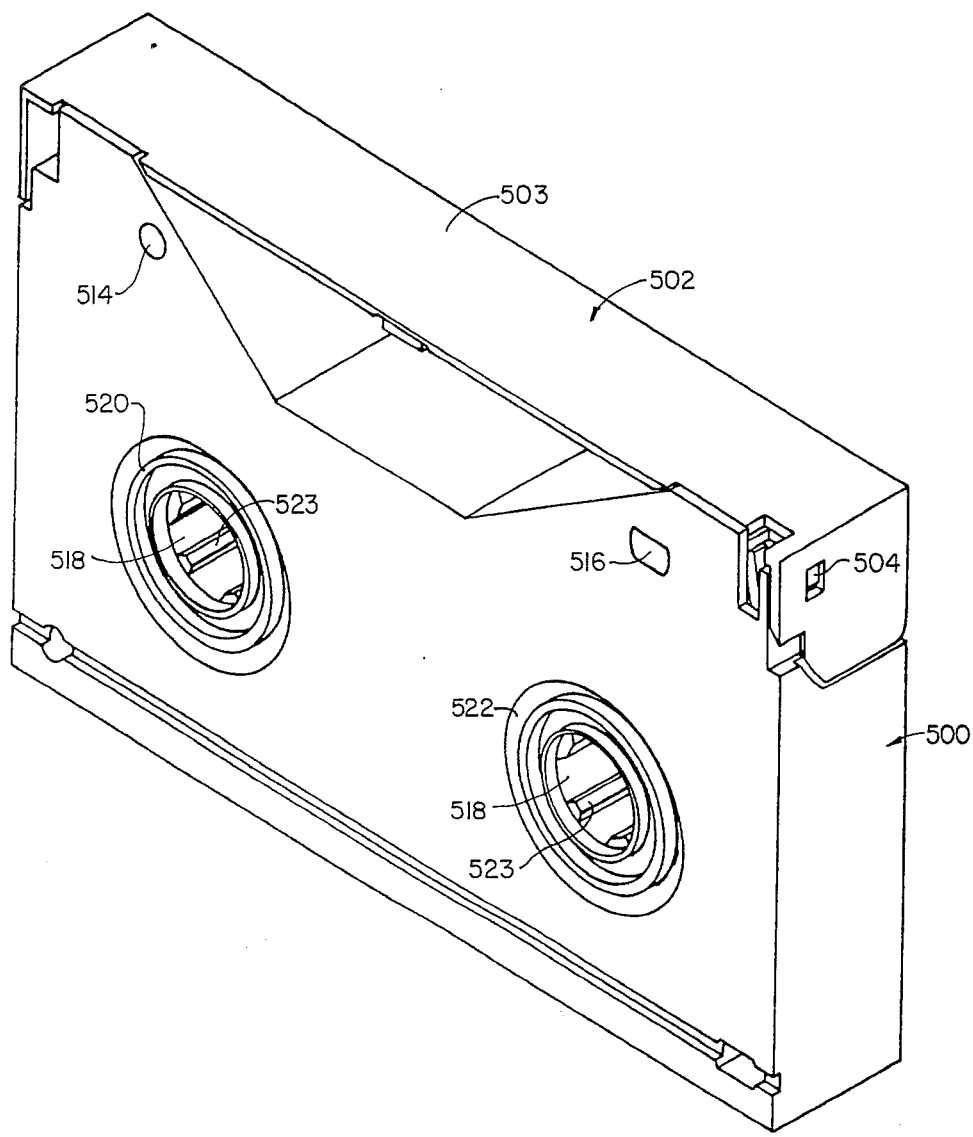
Figure 30:
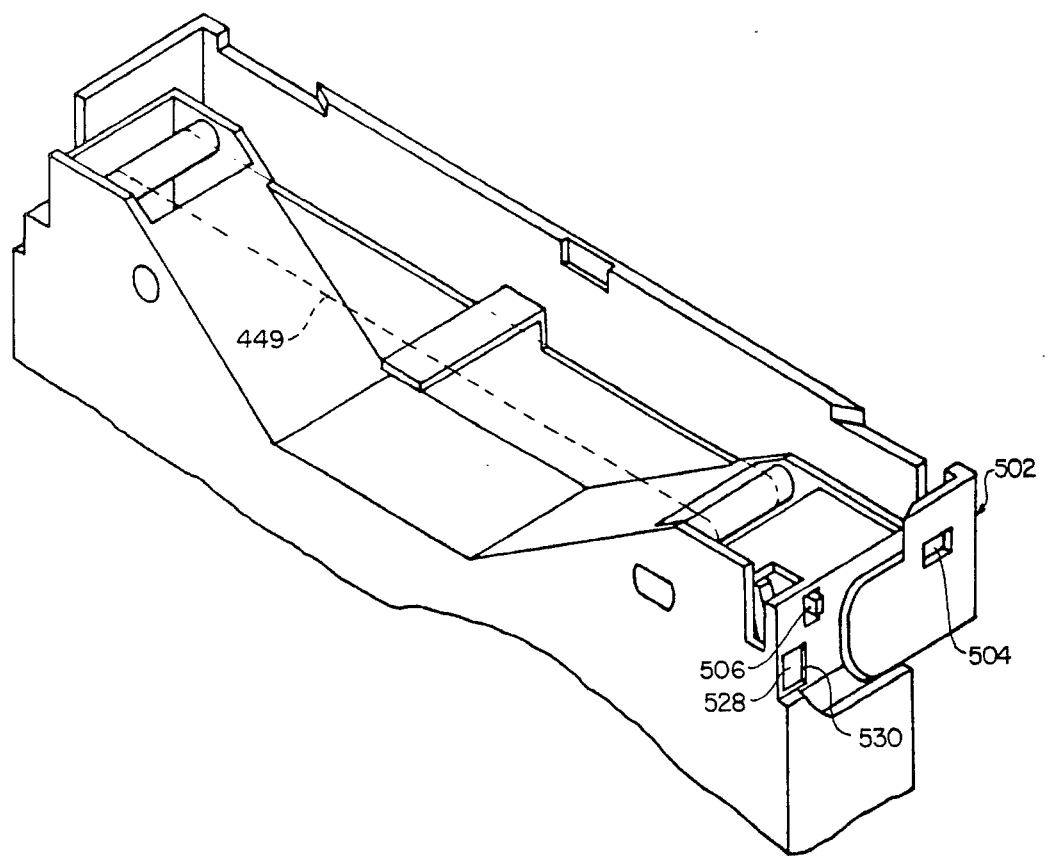

FIGS. 28A, B and C are front and side elevations of the modified carrier used for conveying Betamax cassettes; and FIGS. 29 and 30 are views like FIGS. 24 and 25 showing details of a Betamax cassette.

DETAILED DESCRIPTION OF THE INVENTION

Figure 1:
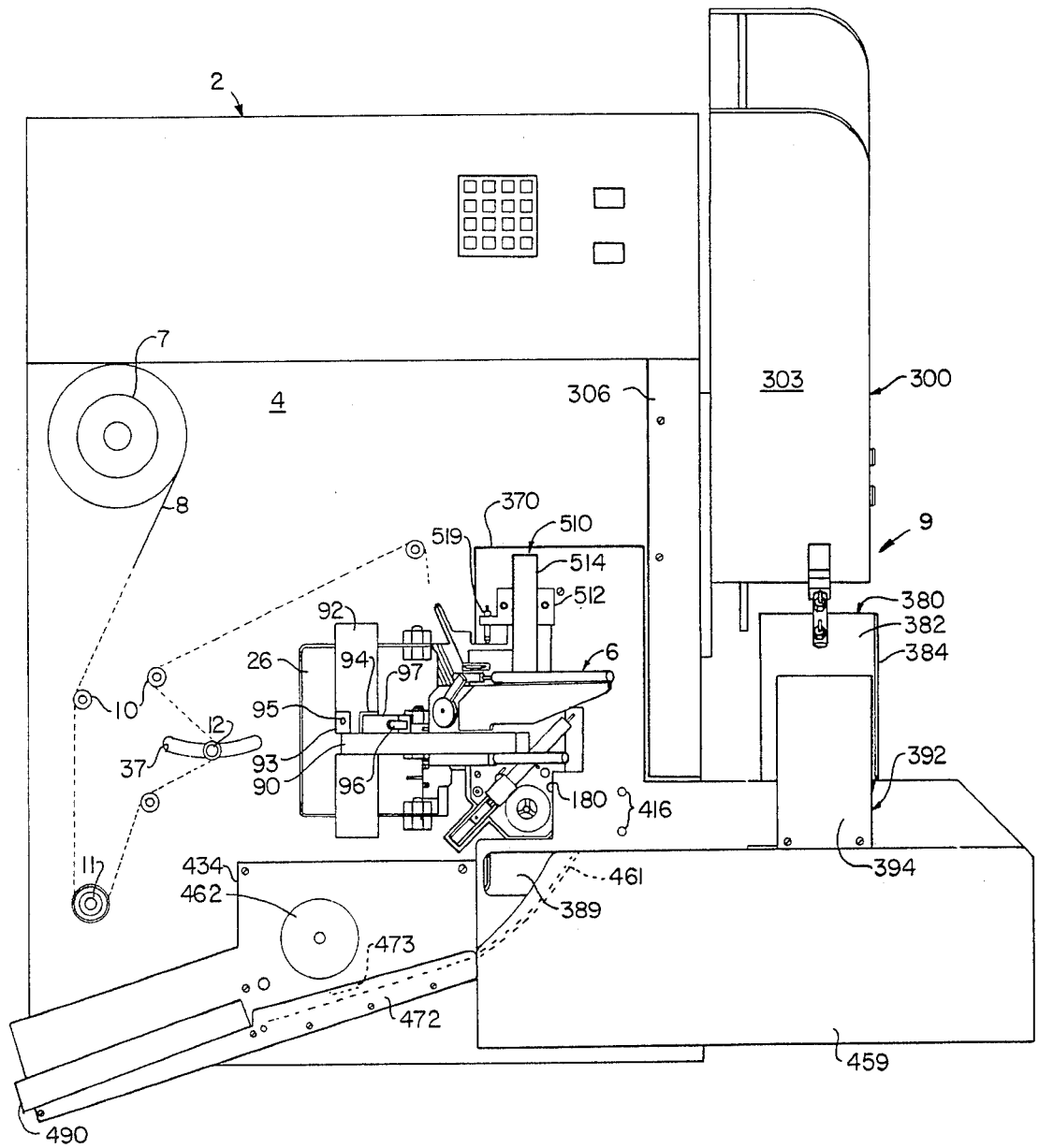
FIG. 1 is a front elevation of an in-cassette video loader which constitutes a preferred embodiment of the present invention adapted for loading VHS cassettes.
Figure 2:
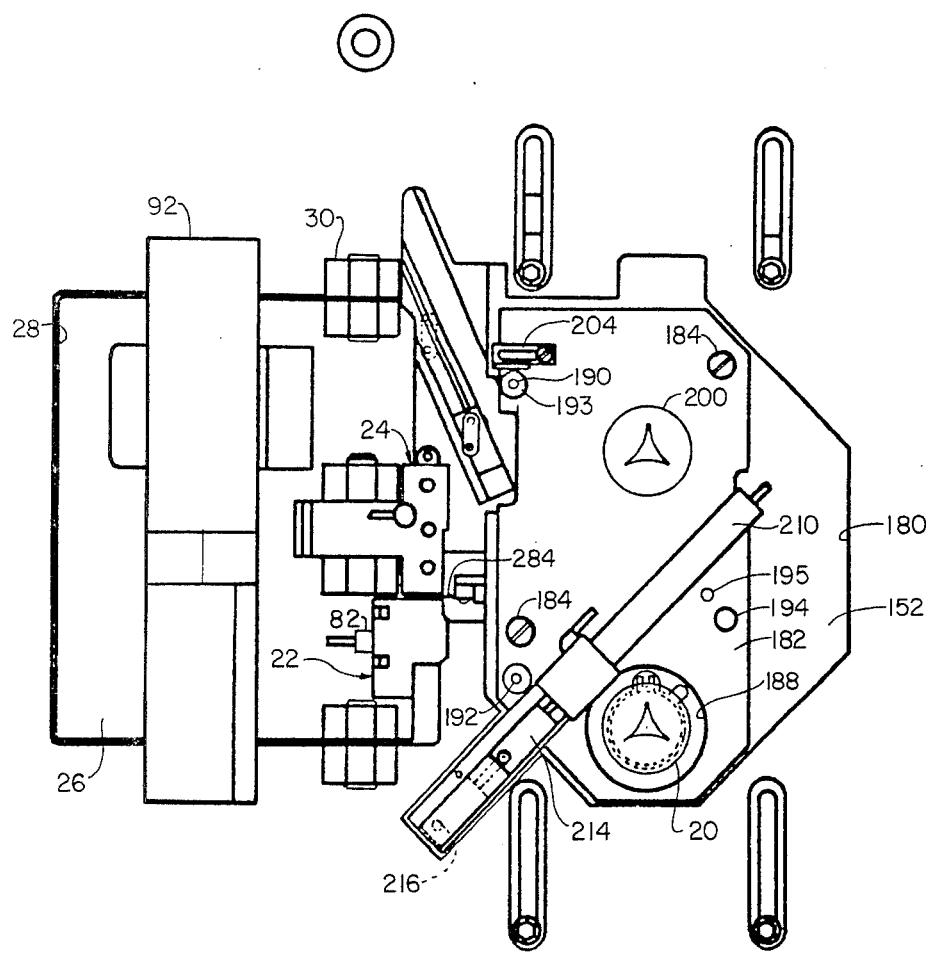
FIG. 2 is an enlarged fragmentary front elevation of the same machine with certain parts (such as the storage magazine and splicer) omitted so as to reveal details of the splicing block assembly and the leader extractor mechanisms.

Turning now to FIGS. 1 and 2, the illustrated machine is adapted for loading magnetic tape directly into C-Zero VHS cassettes. As disclosed hereinafter, the machine shown in FIGS. 1 and 2 may be adapted by the change of certain parts to provide in-cassette loading of Betamax cassettes. It also may be adapted for loading another type of use tape, e.g., a strip of photographic film or typewriter ribbon.

Figure 3:
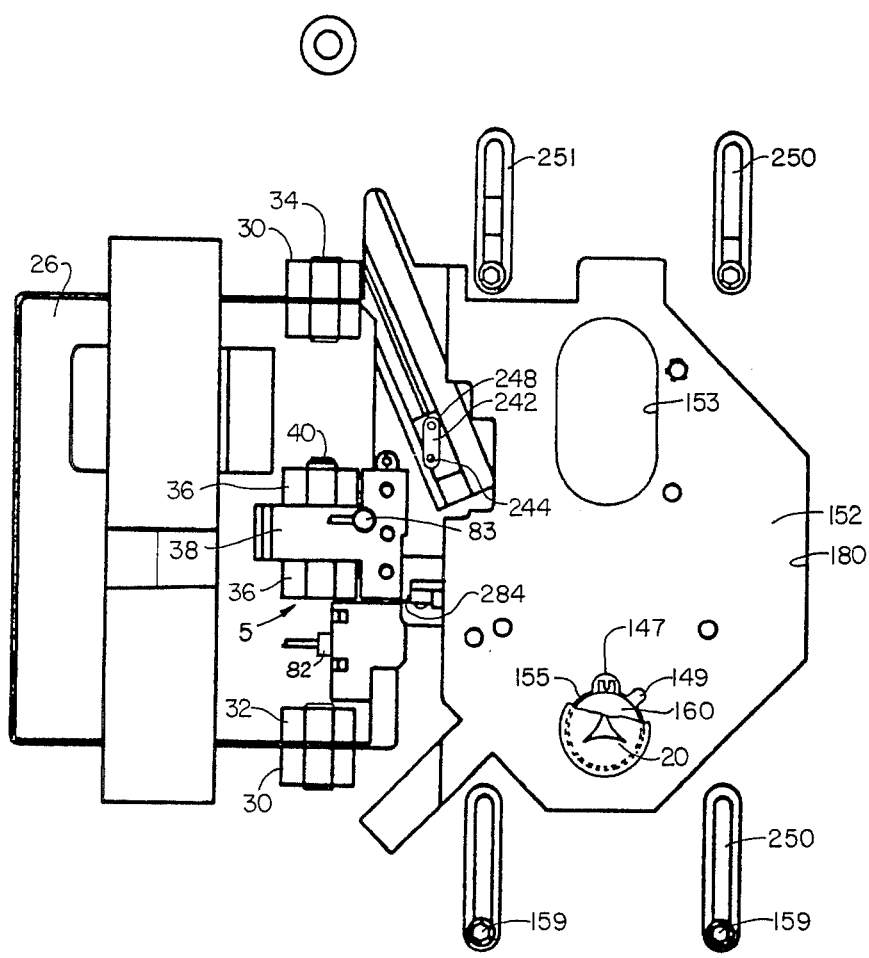
FIG. 3 is a view like FIG. 2 but with the VHS adapter plate removed.

Turning now to FIGS. 1-3, the illustrated cassette tape splicing and winding machines comprises a console 2 having a front panel 4 which supports a splicing block assembly 5, an adhesive tape-dispensing splicer mechanism 6, a rotatable hub 7 for holding a reel of magnetic tape 8 that is used in filling cassettes, and a cassette storing and feeding mechanism 9. Also mounted on front panel 4 is a plurality of fixed guide rollers 10 and a counter wheel 11 which cooperate with a guide roller 12 mounted on a shaft 14 on a dancer arm 13 (FIG. 4) to determine the path of movement of tape 8 from hub 7 to the splicing block assembly. Counter wheel 11 forms part of an electrooptical transducer assembly 15 (FIG. 4) which generates tape footage-counting pulses. The transducer assembly 15 and counter wheel 11 are well known in the art and hence need not be described in detail (see U.S. Pat. No. 4,061,286).

Also referring to FIGS. 2-4, 9 and 10, the machine includes a carriage 16 which carries a servo motor 18 for driving a rotatable winding or takeup spindle 20 (FIG. 2) which is adapted to mate with and drive one of the hubs of a cassette (not shown) which is positioned in a selected loading position on the front of the machine by cassette feeder mechanism 9. The machine also includes a servo motor 19 mounted on the rear side of panel 4 for driving the supply reel hub 7. Although not shown, it is to be understood that motor 19 includes an electrically operated brake for stopping the motor's output shaft when the motor is turned off. Servo motor 18 is controlled by movement of dancer arm 13. Shaft 14 extends through a curved slot 27 in panel 4 and arm 13 is connected to the operating shaft of a rotary potentiometer 21 mounted on the rear side of panel 4. Arm 13 is biased toward the splicing block assembly by a biasing mechanism comprising a small electric motor 33 and a string 35 which extends between the output shaft of motor 33 and arm 13. Motor 33 applies a predetermine pull on string 35 which is sufficient to move arm 13 to the right hand end (as seen in FIG. 1) of slot 37 when servo motors 18 and 19 are off. During operation of the machine the tension on tape 8 will vary and will cause arm 13 to move in accordance with the tension change. The output signal of potentiometer will vary with movement of arm 13 and this signal is used to control servomotor 18 for tension control purposes. Simultaneous control of servomotors 18 and 19 to maintain constant tension on tape being wound may be done by various known techniques, but preferably it is done in accordance with the invention described and claimed in U.S. patent application Ser. No. 290,417 of Joseph P. Deyesso for Tape Winding System.

Turning now to FIGS. 1-3 and 5-8, the splicing block assembly 5 comprises two splicing vertically spaced blocks 22 and 24. Both blocks are attached to a support plate 26 which is positioned in an aperture 28 formed in the front panel 4. Support plate 26 is pivotally mounted to front panel 4 by means of two pairs of pivot lugs 30 and 32, (FIGS. 3 and 5) attached to front panel 4 and plate 26 respectively, and a pair of pivot studs 34. Splicing block 22 is rigidly mountd to plate 26. However, splicing block 24 is pivotally mounted to plate 26. For this purpose plate 26 has a pair of spaced pivot lugs 36 (FIG. 3), splicing block 24 has a lateral extension 38 which fits between the lugs 36, and a pivot stud 40 extends through holes in lugs 36 and the extension 38 so as to pivotally attach the splicing block 24 to plate 26. For convenience, splicing blocks 22 and 24 are hereinafter referred to as the "stationary" and "movable" splicing blocks, but it is to be understood that those terms are employed only to designate which of those members is movable with respect to support plate 26.

Figure 5:
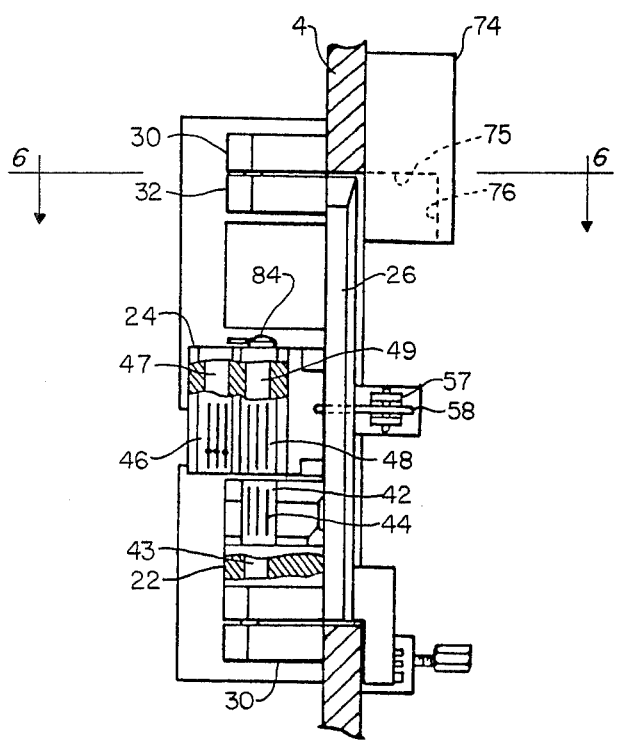
FIG. 5 is a vertical sectional view showing the splicing block assembly and the support for said assembly each in a first position and with certain portions of the two splicing blocks broken away to illustrate the internal suction chambers associated with the three tape-accomodating tracks.
Figure 6:
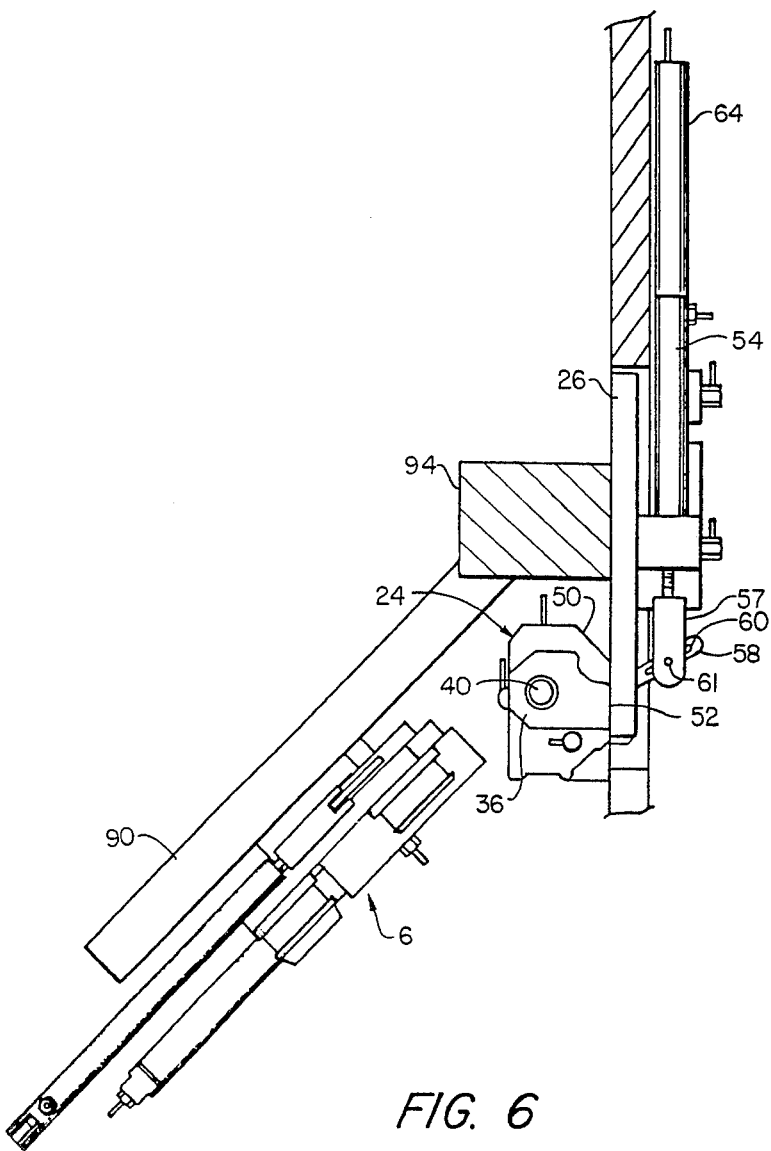
FIG. 6 is a horizontal sectional view showing the splicing block assembly support and the mechanism for rotating the movable block of the splicing block in the positions shown in FIG. 5, but with the splicer in place.
Figure 7:
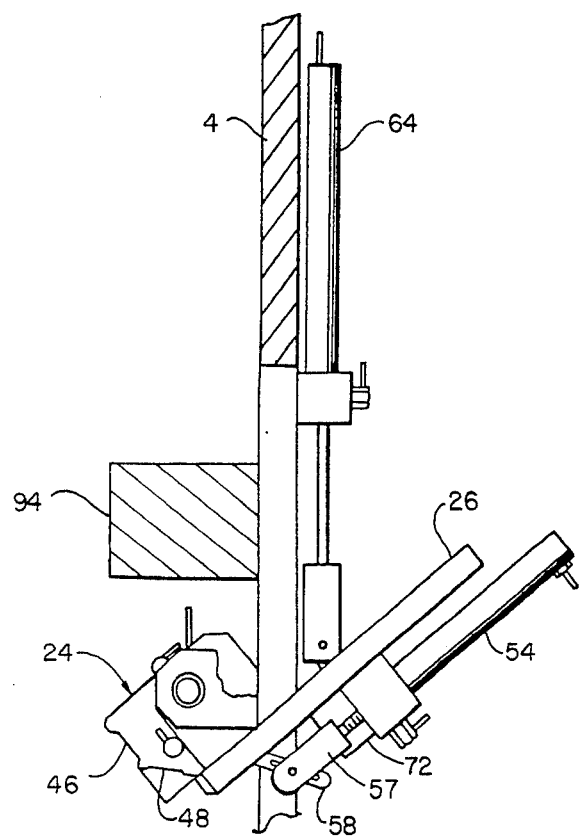
FIG. 7 is a view like FIG. 6 but with the splicing block assembly support in a second position.
Figure 8:
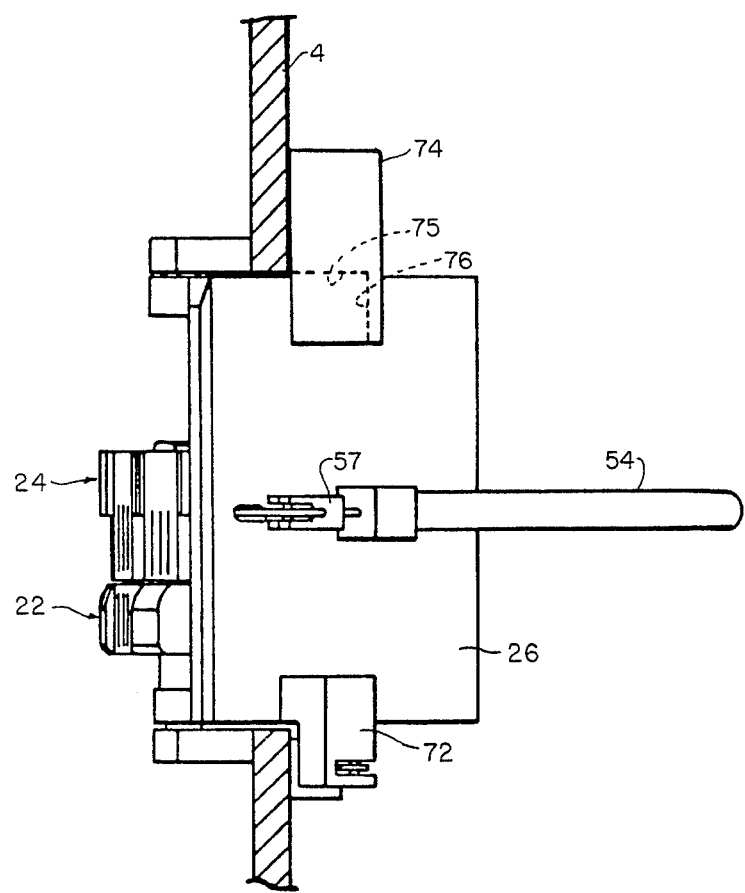
FIG. 8 is a vertical sectional view like FIG. 5 but showing the splicing block assembly support in a second position.

As seen in FIGS. 5-10, stationary splicing block 22 has a single track 42 and block 24 has two identical tracks 46 and 48 for accommodating a leader or use tape. Blocks 22 and 24 are hollow so as to define suction chambers 43, 47 and 49 (FIG. 5). The bottom surface of track 32 is provided with a plurality of elongated apertures 44 which communicate via suction chamber 43 with a suction source so that suction may be applied to hold tape in track 42. Tracks 46 and 48 also are provided with elongated apertures 44 which communicate via chambers 47 and 49 with separate suction sources so that suction may be applied selectively to hold tapes in those tracks. Tracks 46 and 48 are arranged at an angle of approximately 30° to one another. Also, as shown in FIGS. 6-8, splicing block 24 is prismatic in cross-section, having two flat surfaces 50 and 52 which also extend at an angle to one another. The surfaces 50 and 52 are arranged so that when splicing block 24 is rotated on its pivot 40, its rotatational travel is limited by engagement of either surface 50 or surface 52 with the front surface of plate 26. When surface 52 engages plate 26, track 46 is in exact alignment with the track 42 of splicing block 22, and when surface 50 engages the plate 26, track 48 is in exact alignment with track 42 and the flat bottom of track 46 will be displaced 30° from the bottom surface of track 42.

Rotation of splicing block 24 relative to support plate 26 is controlled by means of a pneumatic actuator 54 affixed to the rear side of plate 26. In this connection it is to be noted that a number of actuators are used in the machine. Such actuators may be of the single-acting type wherein the piston/piston rod assembly is spring biased in one direction and driven in the opposite direction by application of high pressure air, or of the double-acting type wherein pressurized air is applied selectively at one or the other end of the cylinder to cause movement of the piston/piston rod assembly in one direction or in the opposite direction. The type of actuator used is a matter of choice.

Figure 4:
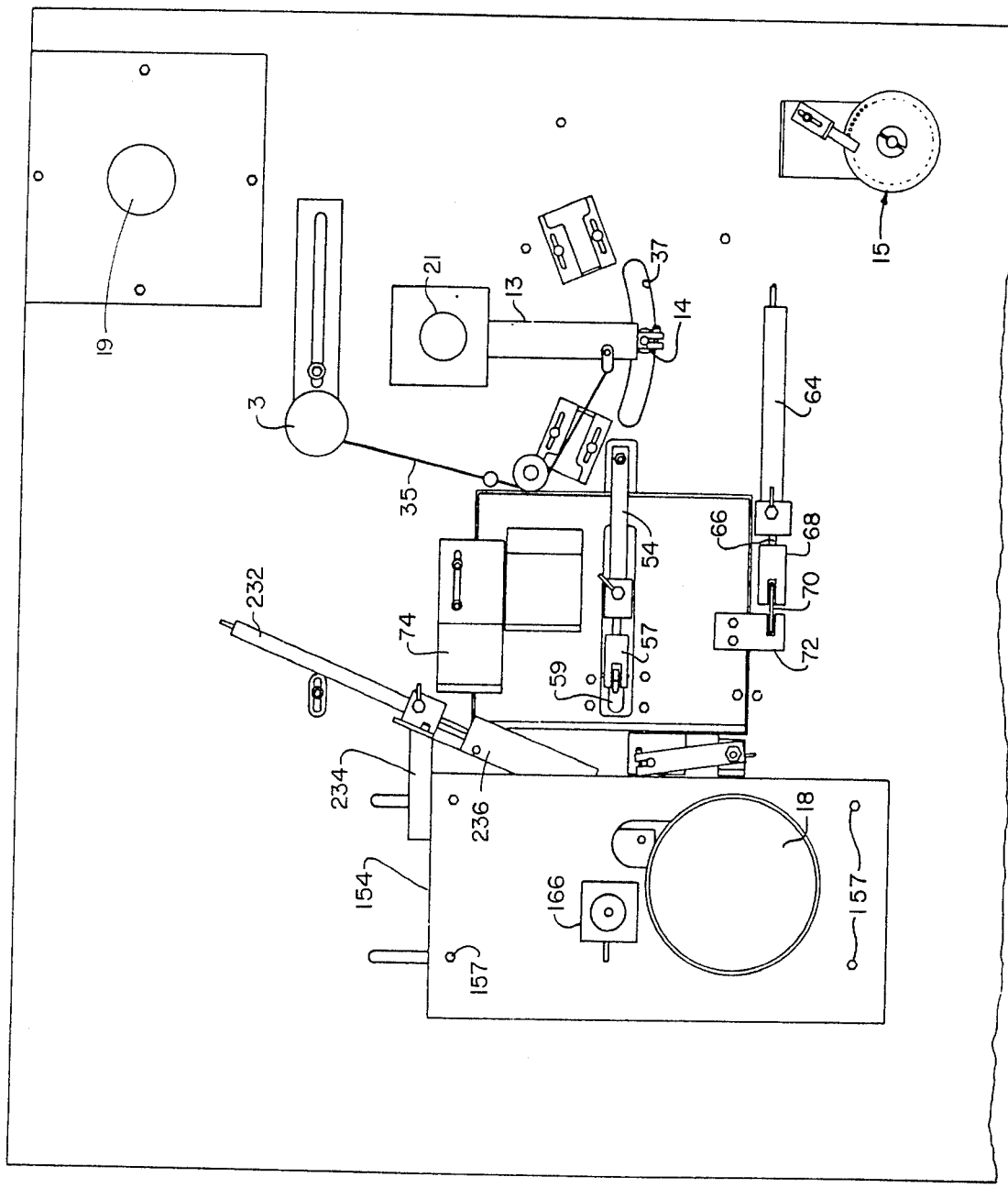
FIG. 4 is a vertical view in elevation of the rear panel of the same machine.

In this case the piston rod 56 of actuator 54 is attached to a bifurcated yoke 57 (FIGS. 4 and 5). The latter is pivotally connected to an arm 58 which is affixed to splicing block 24. Arm 58 extends through an elongate opening 59 (FIG. 4) in plate 26 and has an elongated slot 60 (FIG. 6) to accommodate a pivot pin 61 anchored in yoke 57. The arm 58 extends through a slot 63 in the yoke 57 and is captivated by pivot pin 61. Because of the shape of slot 60, arm 58 can pivot and also move longitudinally relative to pivot pin 61. When the actuator 54 is operated so as to extend its piston rod 56, yoke 57 will cause arm 58 to swing in an arc, with the result that splicing block 24 will rotate on its pivot so as to bring track 48 into alignment with track 42. When the piston rod 56 is retracted, the splicing block 24 pivots back until its surface 52 again engages plate 26, placing track 46 in alignment with track 42.

Figure 9:
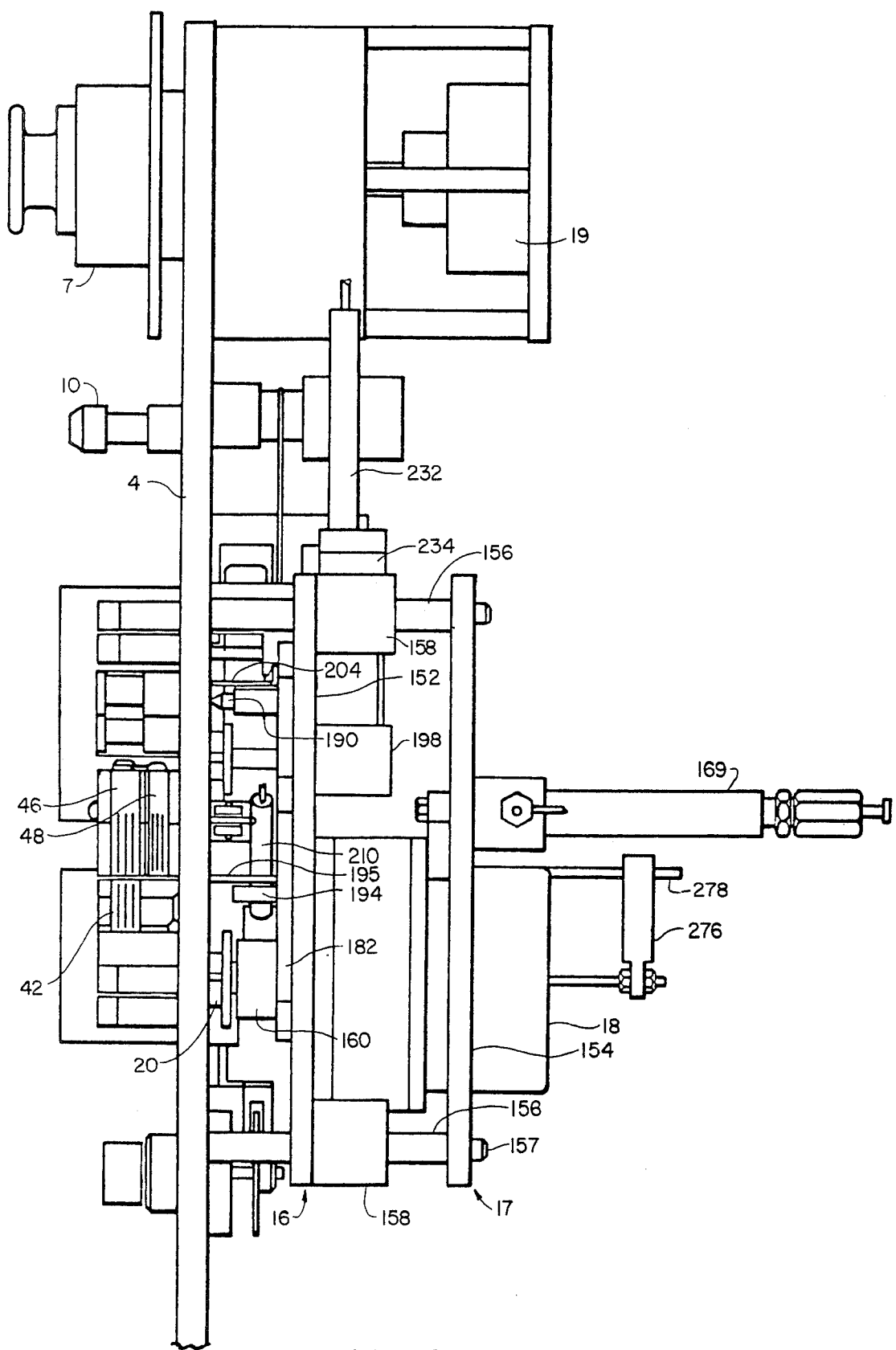
FIGS. 9 and 10 are side views in elevation of the front panel of the machine, with the cassette magazine and feeder mechanism omitted, showing the carriage for the tape winding spindle in its back (retracted) and forward (extended) positions respectively.

Referring now to FIGS. 2-8, the normal or at-rest position of support plate 26 is when it is co-planar with panel 4. During operation of the machine, plate 26 is pivoted through an angle of about 50° so as to align track 42 of stationary block 22 with splicer 6. Pivotal movement of plate 26 is accomplished by means of an actuator 64 which has its cylinder attached to the rear side of panel 4 and has a yoke 68 affixed to its piston rod 66. A link 70 has one end pivotally connected to yoke 68 and its other end pivotally attached to an L-shaped bracket 72 bolted to the rear side of plate 26. When piston rod 66 is retracted, plate 26 is flush with panel 4. When piston rod 66 is extended, plate 26 is pivoted to an angle of 50° relative to panel 4. When plate 26 is pivoted by retraction of piston rod 66, plate 26 is stopped when it is flush, i.e., co-planar with panel 4, by its engagement with splicer holding assembly member 94 hereinafter described. A mechanical stop 74 on the rear side of panel 4 stops movement of plate 26 when it is at an angle of 50° relative to panel 4, in which position it is is parallel with the support arm 90 of splicer 6. More precisely, as shown in FIGS. 5 and 9, mechanical stop 74 has a recess 75 characterized by a vertical surface 76 which extends at an angle of 50° to panel 4 and stops plate 26 when the piston rod of actuator 64 is extended. When plate 26 is swung to its angular position by extension of actuator 64, track 42 of splicing block 22 will be in coplanar alignment with the plunger 134 hereinafter described of the splicer mechanism 6. At the same time, depending upon whether or not the actuator 54 is retracted or extended, either the track 46 or the track 48 will be aligned with the track 42.

Referring now to FIG. 3, stationary splicing block 22 is provided with a fitting 82 whereby its suction chamber 43 may be connected by a hose (not shown) to a suitable source of vacuum (not shown) located behind the front panel 4. Similarly, as shown in FIGS. 3 and 5, splicing block 24 has two hose fittings 83 and 84 whereby suction chambers 47 and 49 respectively are connected by suitable hose lines (not shown) to sources of vacuum (also not shown) located behind the front panel 4. The provision of suction chambers connecting through apertures in tape guiding tracks is old and well known in the art, as illustrated by U.S. Pat. Nos. 3,737,358 and 4,062,719 and other patents therein mentioned.

Figure 11:
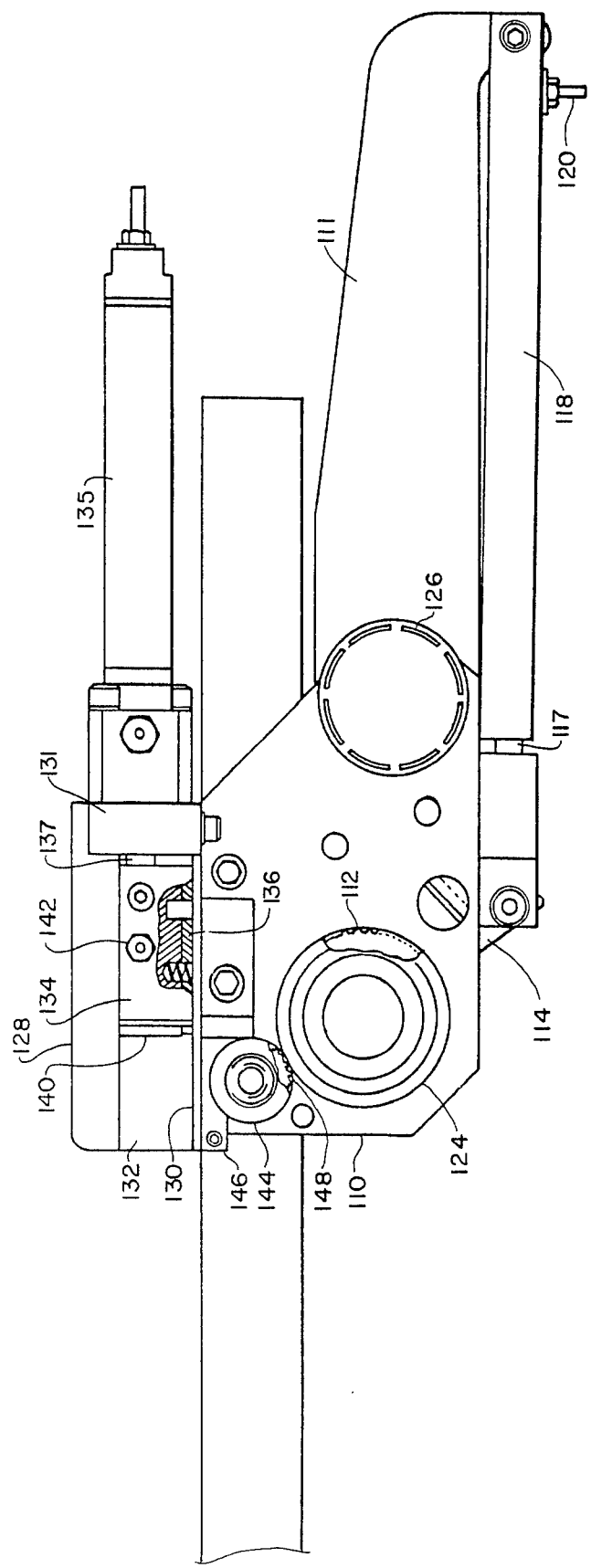
FIG. 11 is a side view in elevation showing details of the splicer mechanism.
Figure 12:
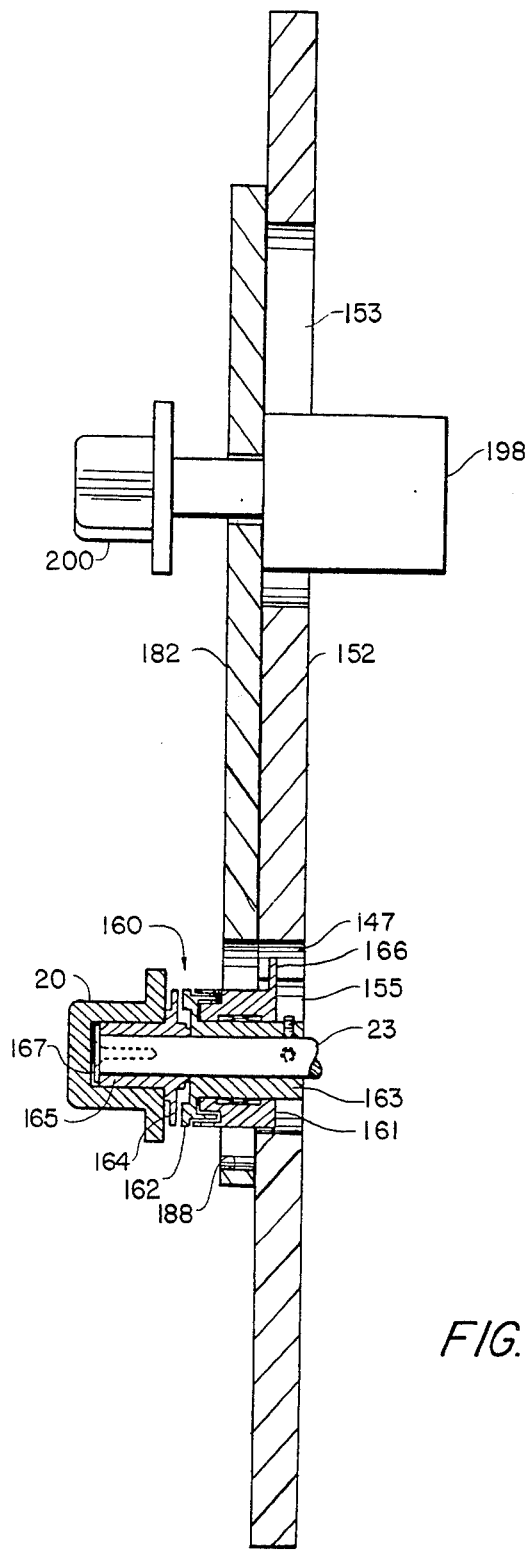
FIG. 12 is a vertical section showing details of the motor and clutch means associated with the two spindles.

Referring now to FIGS. 1, 6 and 11, splicer 6 is attached to a supporting arm in the form of an elongated bar 90 which is pivotally coupled to a block 92 secured to the front side of panel 4. The block has two slots 93 and 94 cut into its front surface at different angles about the pivot axis of bar 90, and the vertical face of each slot is provided with a hole as shown at 95 to receive the inner end of a springbiased pin 96 which is carried by a small mounting block 97 attached to bar 90. The right hand 94 slot extends at and angle of 50° to panel 4, and the left hand slot 93 is displaced about 90° from the right hand slot. When bar 90 is located in one of the slots 93 or 94 and the pin 96 is engaged with the hole 95 associated with that slot, the bar 90 will be locked against movement and the splicer 6 will be held in a fixed position. The bar 90 is locked in slot 94 when the splicer is to be used in the course of a cassette loading operation and is moved to slot 93 when it is desired to provide access to the splicing block assembly.

The splicer forms no part of the present invention. Moreover various forms of splicers may be used with the present invention. Accordingly, the splicer shown in the drawings is described herein only to the extent required to understand the operation of the present invention.

It is preferred to use a conventional splicer of the type shown in the drawings which is generally the same as the splicer shown in U.S. patent application No. 183,472 of David Kincheloe (now U.S. Pat. No. 4,364,791), and U.S. Pat. No. 3,753,835 James L. King.

As seen in FIGS. 1, 6 and 11, the splicer has a back plate 110 and mounted on the back plate is a one-way clutch mechanism 112 (FIG. 1) having an operating arm 114. Operating arm 114 is pivotally attached to the end of the piston rod of a pneumatic actuator 118 which is secured to a plate 111 attached to plate 110. Actuator 118 normally has its piston rod in the retracted position shown in FIGS. 1 and 11. Each time actuator 118 is pressurized with air via a hose fitting 120 (FIG. 11), the arm 114 is caused to move through arc of predetermined length. Rotation of arm 114 causes clutch 112 to rotate a feed wheel 124. The latter is adapted to feed an adhesive splicing tape from a supply roll (not shown) mounted on a hub 126 into position where it may be cut and applied to two tapes which are to be spliced.

As seen in FIG. 11, the splicer has a pair of parallel members 128 and 130 and a header plate 131 defining a channel 132 in which is mounted a reciprocal hollow plunger 134. The plunger is attached to the piston rod of a pneumatic actuator 135 which is fixed to plate 131. Attached to the side of the plunger is a cutter blade 136 which reciprocates with the plunger. The bottom side of the plunger has a resilient pad 140 provided with openings (not shown) which communicate with openings (also not shown) in the bottom side of the plunger, whereby suction may be applied to hold a piece of splicing tape to the pad. Vacuum is applied to the interior of the plunger and to the apertures in pad 140 through a hose fitting 142 which is mounted to the plunger and is used to connect the splicer plunger to a source of vacuum.

Splicing tape from the supply roll (not shown) mounted on hub 126 is fed into channel 132 via an aperture in plate 130. Feeding of the splicing tape is achieved by coaction of feed wheel 124 and a second feed wheel 144. Feed wheel 144 is driven by means connected to feed wheel 124, so that each time arm 114 is operated by extension of actuator 118, the two feed wheels will advance a predetermined length of splicing tape beneath the plunger 134 (no advancement of splicing tape occurs when the piston rod of actuator 118 is retracted due to the one-way action of clutch 112). Additionally each time actuator 135 is operated, plunger 134 is moved along channel 132 far enough for cutter blade 136 to cut a piece of splicing tape extending beneath pad 140 from the remaining portion of the splicing tape. The cut piece of splicing tape will adhere to the pad by suction until the pad deposits it on the splicing blocks 22 and 24 to effect splicing between a leader and a section of magnetic tape held by those blocks The vacuum applied through the apertures in pad 140 is terminated as the pad presses the splicing tape into contact with the two tapes to be spliced, so that when the plunger moves back to its original retracted position, the splicing tape will tend to stay with the spliced tapes rather than adhere to the resilient pad.

Turning now to FIGS. 2–4, 9, 10 and 12, the carriage 16 for takeup motor 18 and take-up spindle 20 comprises a takeup motor carriage plate 152 which is slidably mounted on a carriage support assembly in the form of a plate 154 which is secured behind and parallel to the front panel 4 by means of four elongated rods 156, and screws 157 (FIGS. 4, 10 and 11) and screws 159 (FIGS. 2 and 3) which are screwed into threaded holes in the rear and front ends respectively of rod 156. Carriage plate 152 has four bushing assemblies 158 attached to its four corners which are mounted on and make a smooth sliding connection with rods 156 so that the carriage plate can reciprocate smoothly between plate 154 and front panel 4.

Carriage plate 152 has two apertures 153 and 155 (FIG. 3). Aperture 153 is vertically elongated and aperture 155 has two radial extension slots 147 and 149. Servo motor 18 is affixed to the rear side of carriage plate 152 and has an output shaft 33 to which is connected an electromagnetic clutch 160. Preferably clutch 160 is a type SL (shaft mounted) electromagnetic friction clutch having a housing 161 containing the field coil, a rotor 162 having a hub 163 secured to the output shaft 23 of motor 18, and an armature assembly 164 having a hub 165 on which is affixed to wind spindle 20. Take-up spindle 20 has a front end shaped so that it will easily enter the depression on the rear side of the lower hub of a VHS cassette in loading position and cause the hub to rotate with it. The field coil housing 161 surrounds and is rotatably mounted to rotor hub 163, and hub 165 of armature assembly 164 is rotatably mounted on the output shaft of motor 18. The head of a screw 167 screwed into a tapped hole in the end of shaft 23 holds armature assembly 164 on shaft 23. Housing 161 has a radial projection 166 which extends into the radial extension slot 147 of plate 152, whereby plate 152 locks housing 161 against rotation. Hence with housing 161 locked against rotation, so long as the field coil is deenergized, armature assembly 164 and rotor 162 will be rotatable relative to one another, so that if motor 18 is energized while the field coil is deenergized, the rotor will turn with output shaft 23 but spindle 20 will not rotate. However, if the field coil is suitably energized, the resulting magnetic field will force the armature to frictionally engage the rotor, with the result that the armature and rotor will be clutched together. Hence, if motor 18 is energized at the same time as the clutch field coil, spindle 20 will be driven by motor 18. The machine's control system (hereinafter described) is arranged so that clutch 160 and motor 18 are deenergized and energized at the same time. The radial extension 149 of carriage plate 152 accommodates the electrical leads (not shown) for motor 18.

Figure 10:
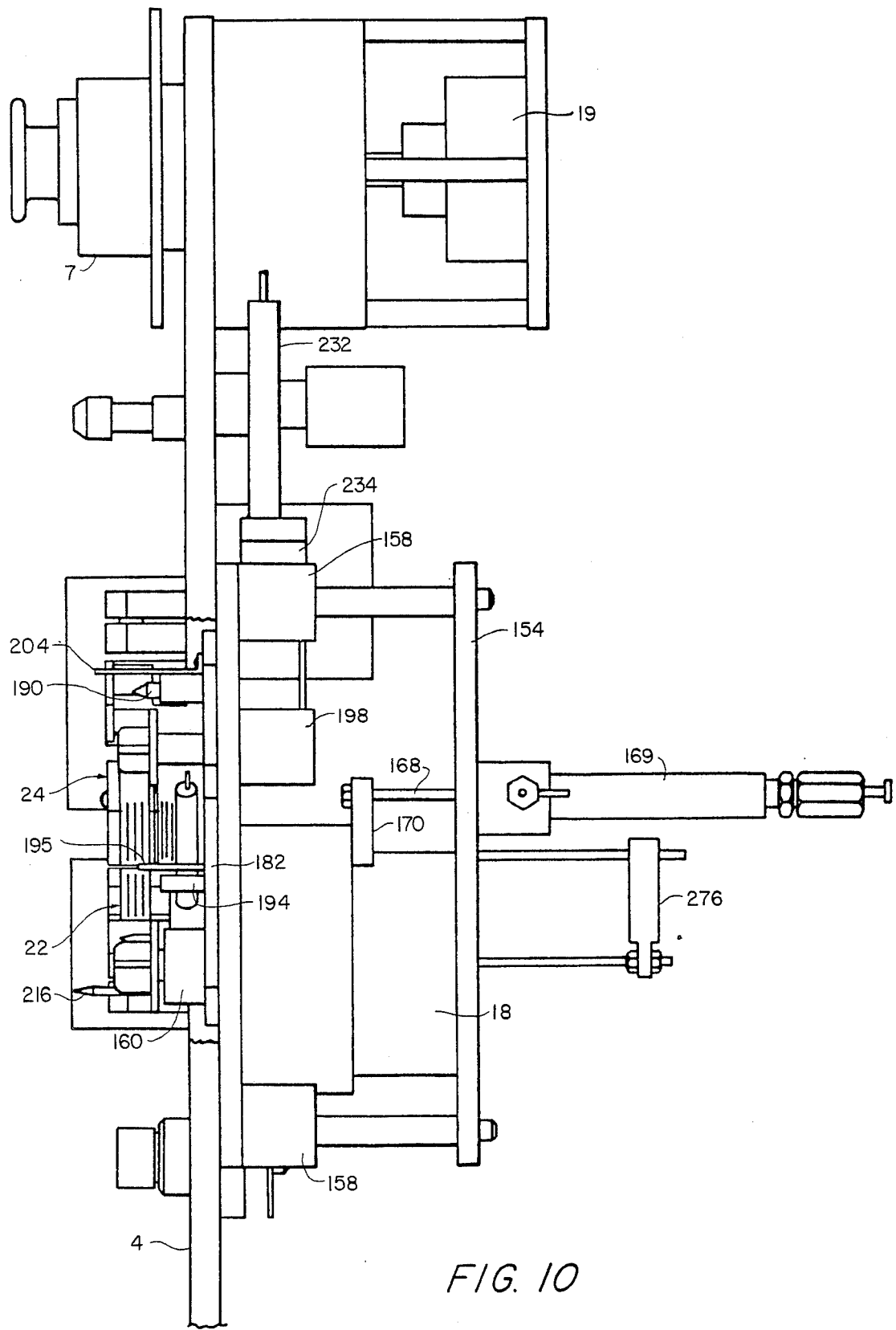

As seen in FIGS. 9 and 10, carriage 16 is movable toward and away from the panel 4 by means of a pneumatic actuator 169 which is attached to plate 154 and has its piston rod 168 connected to carriage plate 152 by means of a bracket 170 which is attached to the piston rod and also to motor 18. The function of actuator 169 is to move spindles 20 and 200 (hereinafter described) into and out of driving engagement with the two hubs of a C-Zero cassette which is in the loading position hereinafter described. In this connection it is to be noted that front panel 4 is provided with an enlarged aperture 180 (FIG. 3) of irregular shape located directly in front of servomotor carriage 16 and in FIG. 9 the piston rod 168 of actuator 169 is shown in its retracted position. In this position the forward ends of spindles 20 and 200 do not project from the front side of panel 4. In FIG. 11 the piston rod of actuator 169 is shown in its extended position. In this position spindles 20 and 200 will project through aperture 180 and be engaged with the cassette hubs if a cassette is in the loading position. The forward limit position of plate 152 is determined by its engagement with the rear side of panel 4, while its back or rear limit position is determined by engagement of bracket 170 with plate 154.

Turning again to FIGS. 2 and 3, the front side of carriage plate 152 serves as a support for an adaptor plate 182 which is designed to facilitate loading of VHS video cassettes.

Adaptor plate 182 is releasably attached to the front of the carriage plate 120 by means of screws and is provided with a large aperture 188 near its bottom end in concentric relation with spindle 20 and clutch 160. Aperture 188 is oversized with respect to clutch 160. Attached to and projecting forwardly from plate 182 are three cassette locator pins 190, 192 and 194 and a cassette door unlocking pin 195. The front ends of pins 190 and 192 terminate in tapered ends and have shoulders 193 spaced rearward of the tapered front ends by like amounts. The front end of pin 194 terminates in a flat surface which is co-planar with shoulders 193. Attached to the rear side of adaptor plate 128 directly above aperture 188 is a leader-shifting assembly comprising a small electric motor 198 having a spindle 200 attached to its output shaft. The function of motor 198 is to transfer excess leader tape from the bottom hub to the top hub of the cassette being loaded, so as to assure that when the leader is cut the section attached to the bottom hub will have a predetermined length. Motor 198 projects rearwardly through the opening 153 in carriage plate 152, while spindle 200 projects through an oversized hole in adaptor plate 182. Spindle 200 has a front end shaped so that it will easily enter the depression on the rear side of the upper hub of a VHS cassette disposed in loading position and cause the hub to rotate with it. Spindle 200 also helps to center or align a cassette in loading position. A cassette having its upper and lower hubs engaged by spindles 200 and 20 respectively and also mated with locator pins 190 and 192 is considered to be in the cassette loading position.

The cassette adaptor plate 182 also carries a flat forwardly projecting arm 204 (FIG. 2) which serves as a door opener for a VHS cassette in cassette loading position.

Figure 13:
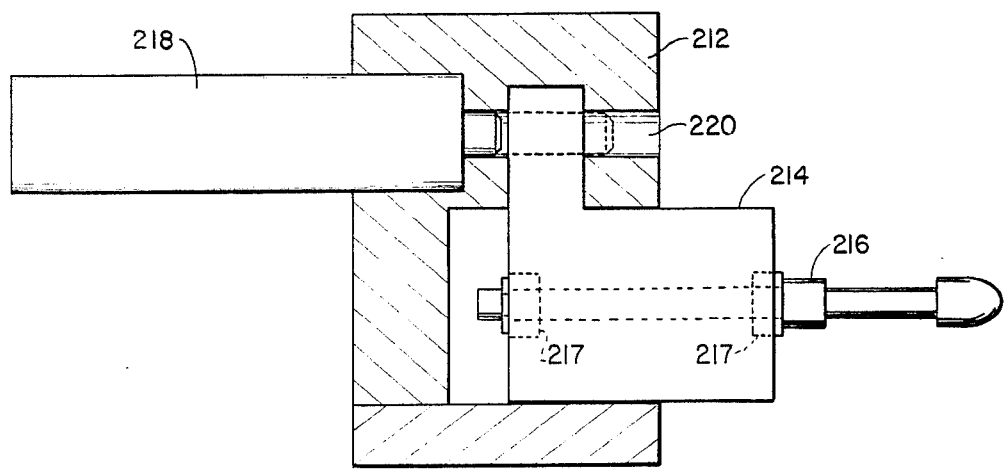
FIG. 13 is a cross-sectional view of the lower leader extractor mechanism showing means for holding the leader extractor in a partially extended position.
Figure 14:
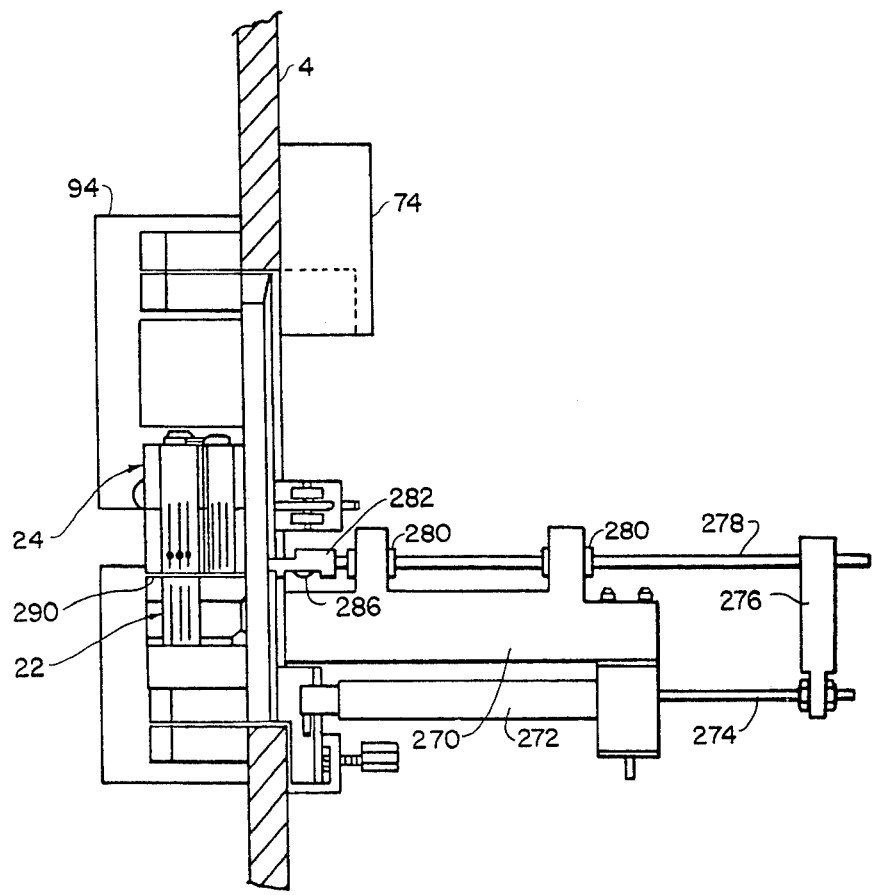
FIG. 14 is similar to FIG. 5 but with the tape cutting mechanism added and the rotatable splicing block in a different position.
Figure 15:
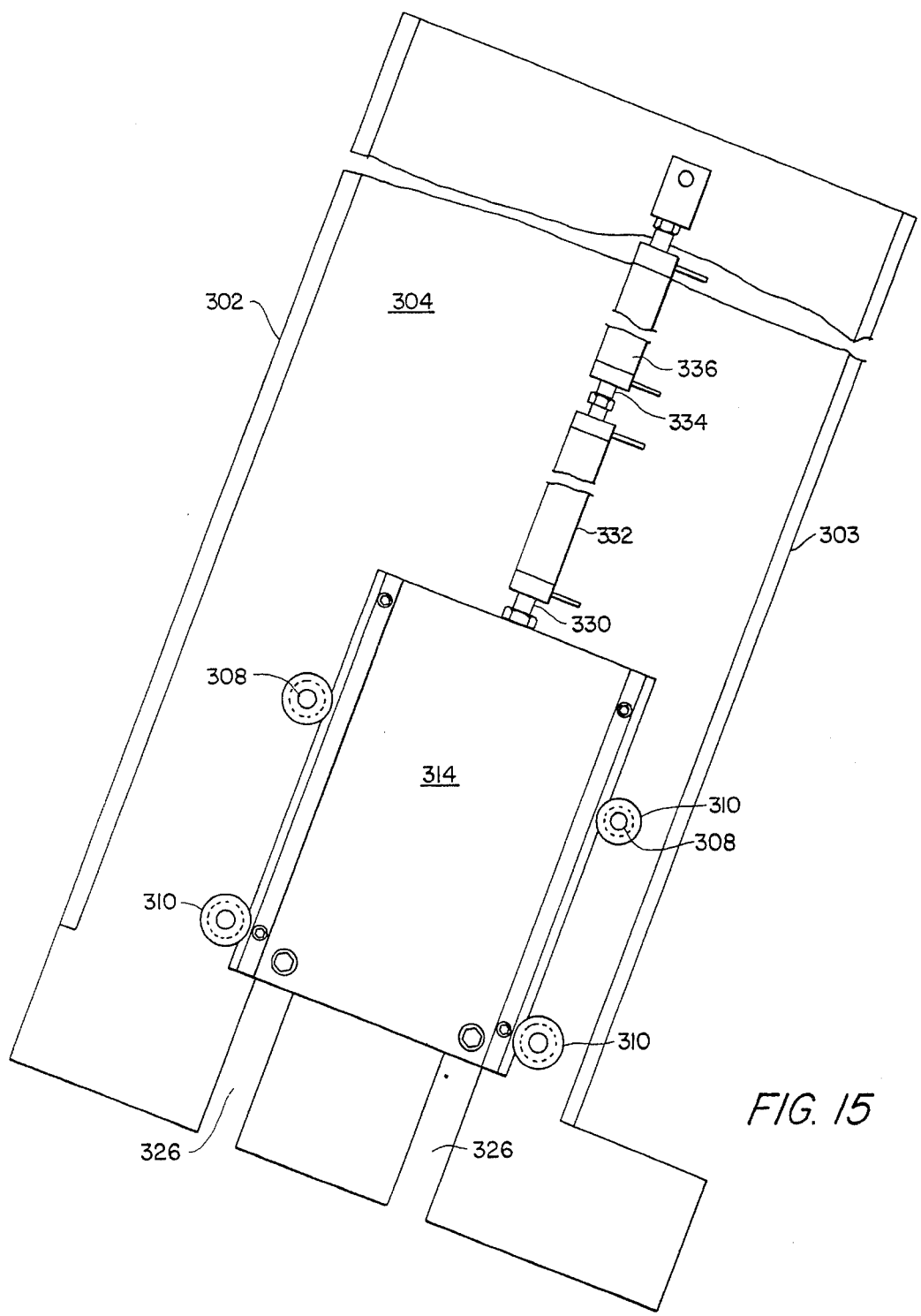
FIG. 15 is an elevational view of the rear side of the cassette magazine.
Figure 16:
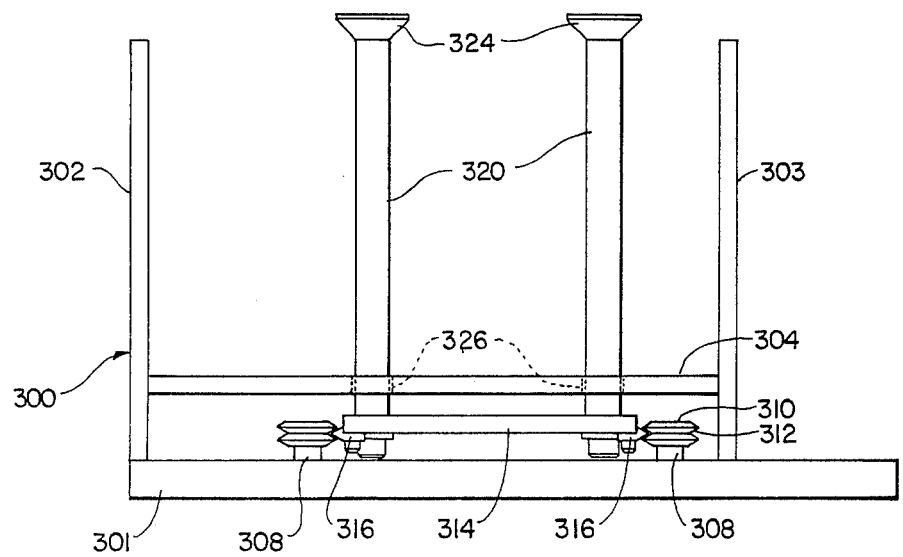
FIG. 16 is a plan view of the cassette magazine.
Figure 17:
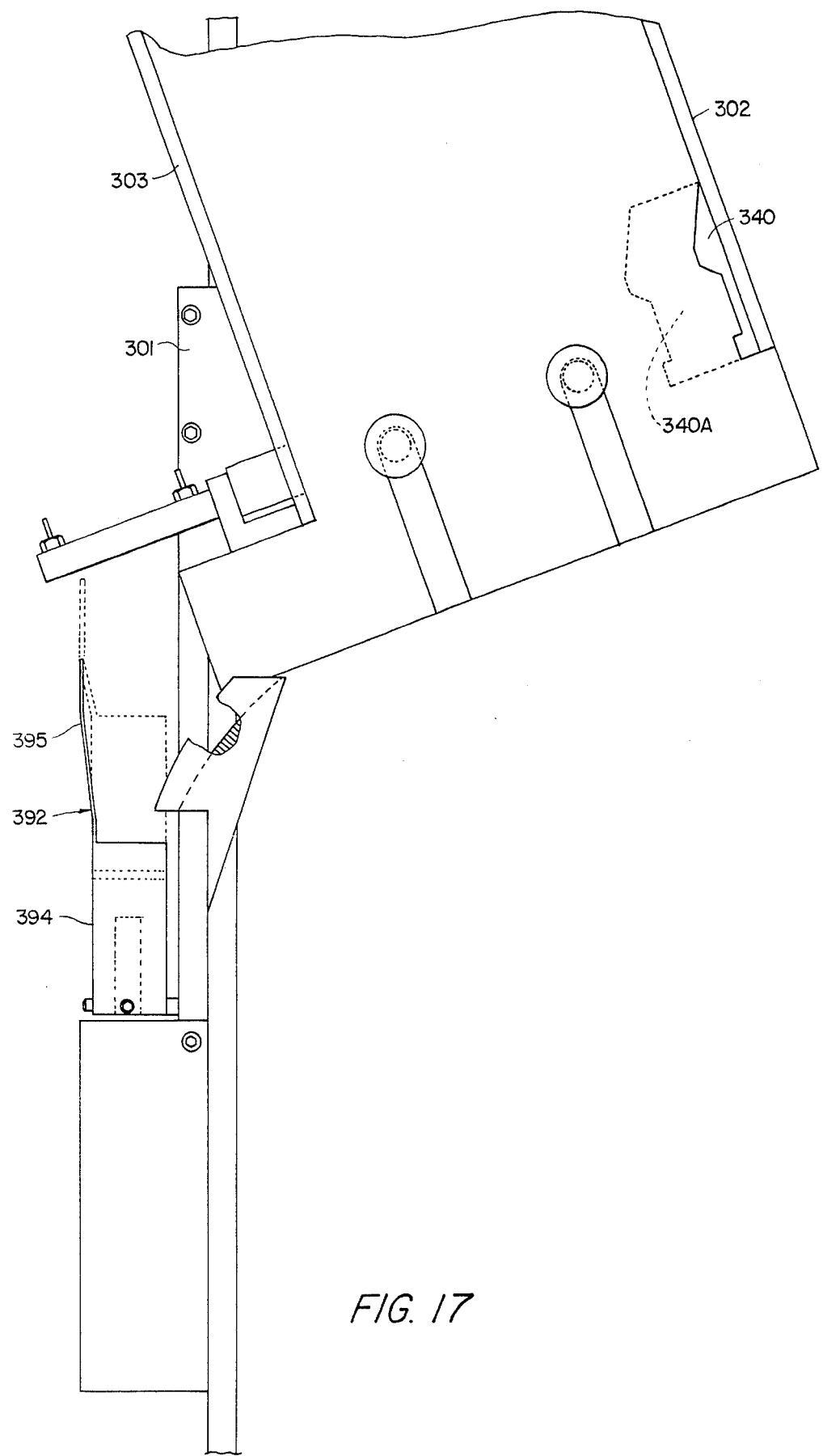
FIGS. 17–20 are side views in elevation showing how cassettes are dispensed by the magazine and the relative position of the cassette guide and cassette carrier.

The adaptor plate also carries a lower leader extractor assembly in the form of a pneumatic actuator 210 having an enlarged extractor pin support member 214 affixed to the end of its piston rod 212. Pin support 214 is restrained against rotation on its axis by virtue of its being slidably keyed to a guide 212 attached to actuator 210. Pin support member 214 carries a forwardly projecting pin 216 which is used to extract the leader adjacent the bottom hub of a cassette located in loading position. Pin 216 is rotatably mounted in member 214 by means of bearings 217 and extends perpendicularly to the adaptor plate and panel 4. Also pin 216 is tapered at its front end so as to facilitate proper entry into a cassette for leader extracting and has a groove for guiding tape during the winding operation. In addition a small pneumatic actuator 218 is mounted in the rear side of guide 212 at a point spaced from the limit position of pin support member 214 when the piston rod of actuator 210 is fully extended. The piston rod 219 of actuator is disposed in a bore 220 that extends through to the front side of guide 212. Actuator 218 normally has its piston rod retracted as shown in FIG. 13, so that it will not interfere with pin support member 214. However, when piston rod 219 is extended to the limit of its travel in bore 220 it will block pin support member 214 from reaching its full extended position.

A second leader extractor assembly is mounted for movement with carriage plate 152. This second leader extractor assembly comprises an actuator 232 (see FIGS. 2-4, 10 and 11) whose cylinder is attached to an actuator support member 234 attached to one of the bushing assemblies 158. This second leader extractor assembly also includes an extractor pin support guide 236. Actuator 232 is mounted at an angle and its piston rod carries an extractor pin support member 238 which is incapable of rotating on its axis by virtue of being slidably keyed to guide 136. Pin support member 38 carries a small flat bar 242 (FIG. 3) which has one end secured to member 238 by a screw 244 and has a leader extractor pin 248 projecting forward from its opposite end. Pin 248 has a conically tapered front end, extends perpendicularly to the adaptor plate, and is disposed so that it can project through aperture 180 when the carriage is moved forward. The angle of bar 242 relative to the piston rod may be adjusted by releasing screw 244, pivoting it about screw 244, and then retightening screw 244 to hold it in its new position. The angular position of bar 242 is set according to whether a VHS or Betamax cassette is to be loaded. In FIGS. 2 and 3, bar 242 is in the position required for loading a VHS cassette.

In this connection it is to be noted that VHS and Betmax cassettes differ in size, notably in the spacing between their cassette hubs. Therefore, to accommodate this difference in cassette sizes, the carriage support assembly 17 is adapted to be shifted vertically by an amount sufficient to permit the machine to handle either type of cassette This feature is illustrated in FIGS. 2 and 3 where the front panel 4 is shown to have four vertically elongated, openings 250, two disposed above and two disposed below the irregular aperture 180, to accommodate screws 159 which lock slide rods 156 to the panel. By loosening screws 159, it is possible to move the carriage support assembly 17 up or down as required to handle a VHS or Betamax cassette Preferably the openings 250 are sized in length so that when the screws 159 are shifted to the bottom ends of the openings (FIGS. 2 and 3), the machine is set to load VHS cassettes, and when the screws are shifted to the upper ends of the openings (FIG. 18), the machine is set to load Betamax cassettes.

Cutting of the leader tape of a C-Zero cassette and the magnetic tape which is wound into the cassette is achieved by a knife mechanism which, as shown in part in FIGS. 2-4, 9, 10 and 14, comprises a bracket 270 which is attached to the rear side of panel 4. Attached to bracket 270 is an actuator 272 having a piston rod 274 to which is attached a connecting arm 276. The latter also is connected to the rear end of a slide rod 278 which slidably extends through two bushings 280 attached to two lateral extensions of bracket 270. The forward end of slide rod 278 carries a knife holder 282. A knife blade 284 (FIGS. 2 and 3) is releasably secured to holder 282 by a screw 286. When actuator 272 is cycled, the knife blade will reciprocate into and out of the narrow gap 290 (FIG. 5) which exists between splicing blocks 22 and 24, whereby any magnetic tape or leader tape extending across the gap will be severed by the knife. A further detailed description of the knife assembly is not believed to be necessary since such cutters are well known in the prior art and various forms of knife assemblies may be used in practicing this invention.

The cassette storing and feeding mechanism 9 shown in FIGS. 1 and 15-23 is designed to hold a plurality of VHS type C-Zero cassettes to be loaded and to feed such cassettes one at a time to the loading position. It includes a magazine 300 comprising a back mounting plate 301, two side wall plates 302 and 303 and a back wall plate 304 which is spaced from mounting plate 301. The plates 302 and 303 are rigidly secured to mounting plate 301 and the entire magazine is mounted to the side panel of the console 2 by a plate 306 which is attached by screws to front panel 4. The magazine is mounted so that its side plates 302 and 303 are inclined to front panel 4 as shown.

Attached to the forward side of plate 301 are four stub shafts 308 which carry rollers 310 having circumferentially-extending V-shaped grooves 312. The rollers 310 serve to guide a slide plate 314. Attached to the opposite edges of slide plate 314 are two bars 316 which have V-shaped edges that ride in the grooves of rollers 310. Slide plate 314 is capable of moving up and down along a path which is parallel to the longitudinal axes of the parallel plates 316. Two rods 320 are secured to and extend perpendicular to the plane of plate 314. The outer ends of rods 320 are enlarged and preferably have a frusto-conical shape as shown at 324. Back wall plate 304 is provided with a pair of parallel slots 326 which allow the rods 320 to move up and down with slide plate 314.

The upper end of slide plate 314 is attached to the piston rod 330 of a pneumatic actuator 332. The cylinder of actuator 332 in turn is attached to and movable with the piston rod 334 of a second pneumatic actuator 336. The cylinder of actuator 336 is secured to rear wall plate 304. The actuators are disposed so that their piston rods extend parallel to slots 326.

Slide plate 314 is movable between an upper limit position (FIGS. 15, 17 and 18) which is determined by the full retraction of the piston rods 330 and 334 and a lower limit position (FIG. 20) which is determined by the full extension of piston rods 330 and 334. Additionally, as described hereinafter, slide plate 314 may occupy a third position (FIG. 19) which occurs when the piston rod of actuator 336 is retracted and the piston rod of actuator 332 is extended.

Referring now to FIGS. 17-20, the magazine further includes clamping means for locking a cassette in a selected position. Such means comprises a stationary block 340 which is attached to the inner side of side panel 302. The inner side of plate 340 is contoured from top to bottom so as to have in descending order an inclined surface 342, a flat surface 344, an oppositely inclined surface 346, a flat surface 348, a right angle surface 350, and a flat surface 352 which is parallel to but is offset from surface 344. Surfaces 344, 348, and 352 extend parallel to side plate 302. Thus, the plate 340 has a groove 354 with a dimension extending parallel to side panel 302 which is slightly larger than the thickness of the cassettes C which are to be stored in the magazine. The surfaces 350 and 352 function as a lip for supporting a cassette as explained in detail hereinafter, while surfaces 342 and 344 limit sidewise movement of a cassette toward side plate 302 while allowing the cassette to drop down into the discharge opening defined by side plate 303 and surface 352. Surface 346 guides a clamped cassette toward surface 348.

The clamping means further includes a pneumatic actuator 358 which is attached by a bracket 360 to side panel 303. The latter has a hole 362 which is sized to pass a plunger 364 attached to the piston rod of actuator 358. The plunger 364 has a flat face 368 at its outer end which extends parallel to and is in opposed relation to the surface 348. The plunger 368 has a height dimension parallel to the plane of panel 303 which is less than the thickness of a cassette C, while the same dimension of surface 348 exceeds the cassette thickness. When the piston rod of actuator 358 is in its fully retracted position, end face 368 of plunger 364 is flush with the inner surface of panel 303 or preferably is withdrawn into the opening 362 so as not to obstruct decending movement of cassettes in the magazine. However, when the piston rod is extended, plunger 368 will project into the magazine and, if a cassette is disposed between it and surface 348 it will force the cassette into groove 352 tight against surface 348, so as to clamp it in the magazine.

Turning now to FIG. 1, a large L-shaped support plate 370 is releasably secured to front panel 4 of the machine. Plate 370 is notched so as to fit around the opening 180 in the front panel. A cassette guide 380 is attached to plate 370 below magazine 300. Guide 380 is provided with a curved front surface 382 which extends adjacent the bottom end of panel 304 to a point where it is in the same plane as the front surface of plate 370. Additionally, the guide has a right angled flange 384 at its right hand side (as seen in FIG. 1).

Still referring to FIG. 1 and referring also to FIGS. 17-21, the cassettes are fed one at a time from the magazine to the cassette loading position by a cassette conveyor mechanism which comprises a slide 386 which is disposed within and slides longitudinally along a slot 389 in plate 370. Attached to the slide is a cassette carriage 390 which serves as the floor of a VHS cassette carrier 392. The latter includes a front wall 394 and a right hand side wall 396 held to carriage 390 by screws. The upper portion of front wall 394 is bent outwardly as shown at 395 so as to extend at an angle relative to plate 370. The cassette carrier extends up far enough so as to be able to receive cassettes as they fall out of the magazine and drop downward along the guide surface 382. The outwardly inclined portion 395 and the curved surface 382 function as a mouth or funnel so as to assure that a falling cassette will drop down onto the carriage and be engaged by the vertical walls of the carrier.

The slide is reciprocated along the slot 390 by means of a drive mechanism comprising a double-acting pneumatic actuator 400 having pulleys 401 attached to its opposite ends, two cables 402 and 404, and a Ushaped coupling member 406. Coupling member 406 is attached directly to the carriage. Cables 402 and 404 each have one end attached to the coupling 406. The other ends of cables 402 and 404 are attached to the opposite ends of the piston of actuator 400. The actuator is attached to plate 370 and the opposite ends of its cylinder are provided with seals which allow the cables 402 and 404 to move in and out of the cylinder without leaking pressurized air from the cylinder. When pressurized air is applied to one end of the cylinder via a hose fitting (not shown), the piston of the actuator is caused to move to the right as seen in FIG. 1), thereby causing slide 386 and carrier 392 to move to the left toward the splicing block assembly. When pressurized air is applied to the opposite end of the cylinder via a hose fitting (not shown), the cables are caused to move cassette carrier 392 away from the splicing block assembly back toward the cassette guide plate 380. Slot 389 has a length such that when slide 386 is at one end of the slot, the cassette carrier 392 will be in the position shown in FIG. 1 directly in front of the cassette guide 380, with the side wall 396 of the carrier being even with or slightly to the right of the side flange 384 of guide 380. When slide 386 reaches the other end of slot 389, the cassette carrier will be located so that a cassette disposed in the holder will have its two hubs aligned with the spindles 20 and 200.

In order to make certain that each cassette to be loaded is properly located in the preselected loading position, provision is made for assuring that the cassette will be resting against the walls 394 and 396 when the carrier reaches the limit of its travel toward the splicing block assembly. This is achieved by providing (FIGS. 1 and 22) two balls 416 which are mounted in circular holes 418 in plate 370. The front ends of each hole 418 is spherically curved so that its opening in the front side of plate 370 is smaller than the diameter of balls 416. On its rear side plate 370 is swaged or peened over at one or ore points around the holes so as to prevent the balls from falling out when the plate is removed from front panel 14. Since the diameter of balls 416 is larger than that of the holes 418 on the front side of plate 370, only portions of the balls can protrude from the front face of plate 370. Holes 418 are long enough to permit the balls to move back to panel 4 at least far enough so as not to project out of the front face of plate 370. Just behind holes 418 panel 4 has two aligned holes 420. O-rings 422 are seated in counterbores in the front face of panel 4 around holes 420 and hose fittings 424 are secured in the holes 420 on the back side of panel 4. The O-rings are compressed by plate 370 and thus prevent air leakage between panel 4 and plate 370. The fittings 424 are connected by hose lines (not shown) to a source of pressurized air. So long as pressurized air is applied to the fittings, the balls 416 will be pressed forward in holes 418 and portions of the balls will project beyond the front face of plate 370. However, if the balls are forced rearwardly by hand or by the pressure of a cassette, pressurized air will bleed around the balls out of holes 418, thereby reducing the forward bias on the balls created by the pressurized air and making it easier to keep the balls from projecting from the front face of plate 370.

As a result, when a cassette supported by carrier 392 is advanced toward the splicing block assembly, the cassette will engage balls 416 and will be pressed forward against the front wall 394 of the carrier. At the same time the balls will exert a dragging force on the cassette urging the cassette to be seated tight against the side wall 396 as the carrier continues to advance the cassette toward the splicing block assembly. The balls are located so that the cassette being advanced will clear the balls just as the cassette reaches the preselected loading position and the holder stops. Preferably the upper surface of the carriage 390 and the inner surfaces of walls 394, 396 are covered with a layer of a cushioning material, e.g., a felt, which will prevent damage to a cassette as it is received from magazine 300. Additional cushioning material may cover guide surface 382 for the same purpose.

Figure 22:
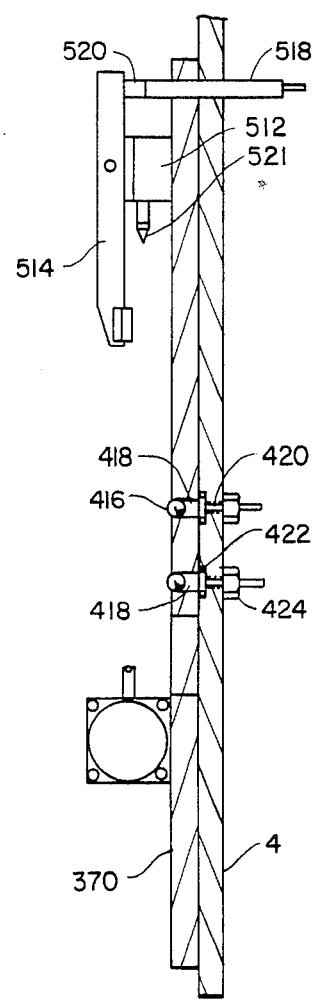
FIG. 22 is a sectional view of the front panel in side elevation showing the cassette clamp and other details.

Still referring to FIG. 1, the plate 370 further supports a cassette clamp (FIGS. 1 and 22) in the form of a pivot block 512 attached to plate 370 and a clamp arm 514 which is pivotally mounted to the pivot block 512. As seen in FIG. 22, the clamp may be biased so that its bottom end will engage a cassette and hold it tight against the portion of plate 370 surrounding aperture 180. This biasing is accomplished by means of a pneumatic actuator 518 mounted to plate 270 and having its piston rod 520 extending into an oversized blind hole in a small block 520 affixed to the upper end of arm 514. The actuator projects rearwardly through a hole in panel 4. When the clamp is not biased, it will hang vertically and in this position the gap between the bottom end of the arm and the plate 370 will exceed the thickness of a cassette so that a cassette may be moved by carrier 392 between the arm into loading position and panel 4. As soon as carrier 396 has moved a cassette in to loading position, actuator 518 is operated so as to extend its piston rod and thereby cause clamp arm 514 to clamp the cassette tight against plate 370. The clamp remains in this position until the cassette has been loaded. At the conclusion of the loading cycle, actuator 518 is operated so as to allow the clamp arm to release the cassette, whereupon the cassette will fall free by gravity down onto the chute 472.

Figure 23:
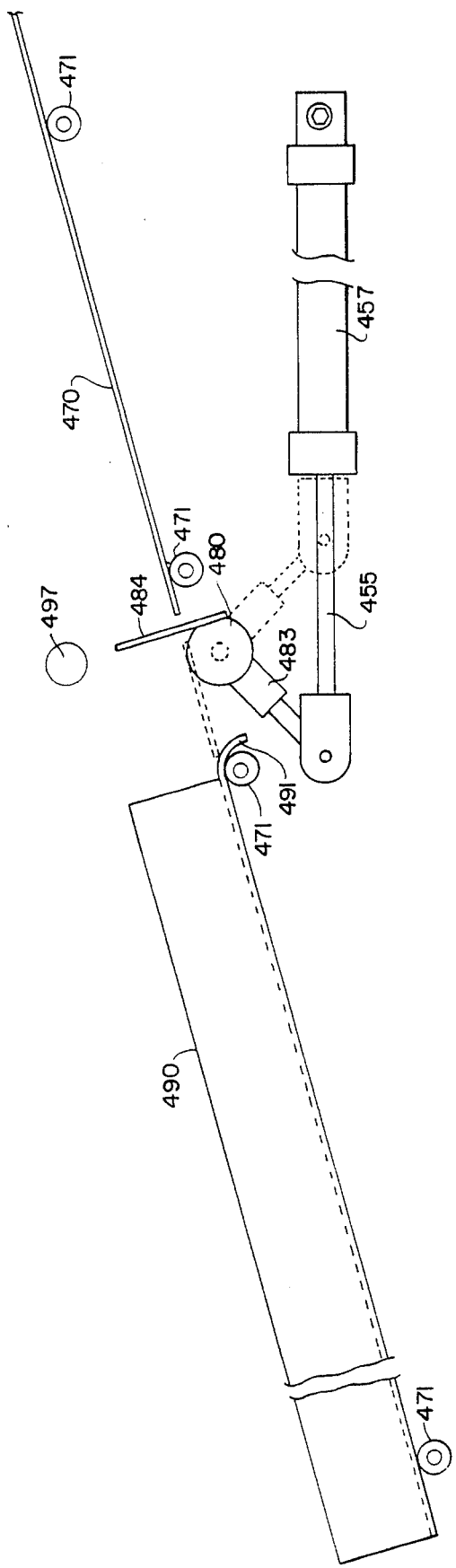
FIG. 23 is a fragmentary front elevation showing details of the chute for receiving loaded cassettes.

Referring to FIGS. 1 and 23, a cassette delivery chute and cassettes receiver assembly is mounted on the front panel of the machine to the left of plate 370 below the splicing block assembly. This mechanism comprises a removable cover plate 459 which conceals the actuator 400 and has a curved and recessed top surface 461 which functions as a chute for directing loaded cassettes onto a platform 470 hereinafter described. A plate 434 is attached to the front panel 4 and has an aperture to accommodate a circular pusher type cassette ejector disc 462 attached to the piston rod 464 of a cassette eject actuator 469 (FIG. 26) attached to the rear side of panel 4. Attached to plate 434 is a plurality of parallel rods 471 and a side plate 472 is attached to the outer ends of rods 471. A plate 470 secured on rods 471 between plate 434 and side plate 472 serves as an inclined cassette platform. Extending between and rotably mounted to plate 434 and side plate 472 is a shaft 480 having attached thereto a narrow radially extending plate 484 which functions as a flapper type gate for cassettes. A radially extending arm 483 is affixed to shaft 480 and is pivotally attached to the piston rod 455 of a pneumatic actuator 457 mounted to plate 434. This gate is located at the discharge end of platform 470. Side plate 472 extends above platform 470 and this acts to stop cassettes pushed laterally by ejector disk 462. A switch 473 (FIG. 1) affixed to the inner side of plate 472 is caused to change states when engaged by a cassette on platform 470. Switch 473 is connected so as to operate a solenoid valve 475 (FIG. 26) which controls operation of actuator 457.

Preferably platform 472 is wide enough to accommodate eleven cassettes. A resilient bumper 497 (FIG. 23) attached to plate 434 just above the gate mechanism acts to cushion the cassettes as they fall down from chute 461. Chute 461 is narrow so as to accomodate only one cassette at a time and bumper 497 does not extend forward from plate 434 more then the width of chute 461. Ejector disk 462 is moved forward only about the width of a cassette so as to cause the cassette to clear the bumper and descend further into contact with the flapper gate.

A removable cassette tray 490 is associated with the chute. The tray has a floor, two side walls and an end wall remote from chute 461. The other end is open and has a curved lip extension 491 which hangs over one of the rods 471 near shaft 480. The other end rests on another rod 471. The floor of the tray is flush with the platform 472 so as to permit cassettes to enter the tray as they slip off of the platform. The tray is just wide enough to accomodate ten trays.

As each cassette drops down onto platform 472 against bumper 497, disk 462 is operated to slide the cassette forward against side plate 472. When the tenth cassette is received and pushed forward by disk 462, the first disk will be forced against switch 473 and thereby cause the flapper gate to turn to its down position so as to allow the ten cassettes to fall down into tray 490.

As seen in FIGS. 1 and 22, the pivot block 512 also acts as a rigid support for a VHS door unlocking means in the form of an actuator 519 which has a tapered member 521 on the end of its piston rod. The piston rod of actuator 519 is normally retracted and is extended only when a VHS cassette is in loading position, so as to unlock the door of the cassette.

Referring now to FIGS. 24 and 25, a typical VHS cassette 440 comprises a cassette body having top and bottom wall sections 442 and 443, a rear side wall section 444, and two end sections 445 and 446. At its front end the cassette has a door or cover member 447 having a top wall section 448, opposite end wall sections 450 and 451, and a front wall section 452. Cover member 447 is pivotally secured to the cassette body end wall sections 445 and 446 and is spring-biased so that it will tend to remain closed. The cassette also has a spring-biased locking pin 458, and a depression 460 in the inner surface of end section 450 of door member 447 receives locking pin 458 when the door is in closed position. A spring biased unlocking pin 459 projects from end wall section 445 into an edge slot in cover section 450. When pin 459 is pressed into the cassette, locking pin 458 will move out of depression 460 so as to unlock the door 447. The cassette body additionally has a number of cavities 463, 464 and 465 and edge slots 471 and 473.

The cassette 440 also includes two rotatable cassette hubs 467 and 468 each formed with a spindle-receiving depression 469 defined by a series of teeth 470 that allow the hubs to be lockingly engaged by the two cassette spindles of a VCR machine.

Cavities 463 and 464 are merely blind holes which receive locator pins 190 and 192 respectively. Cavity 465 leads to a hub locking mechanism (not shown) and receives hub unlocking pin 195 which will unlock the two hubs.

Figure 26:
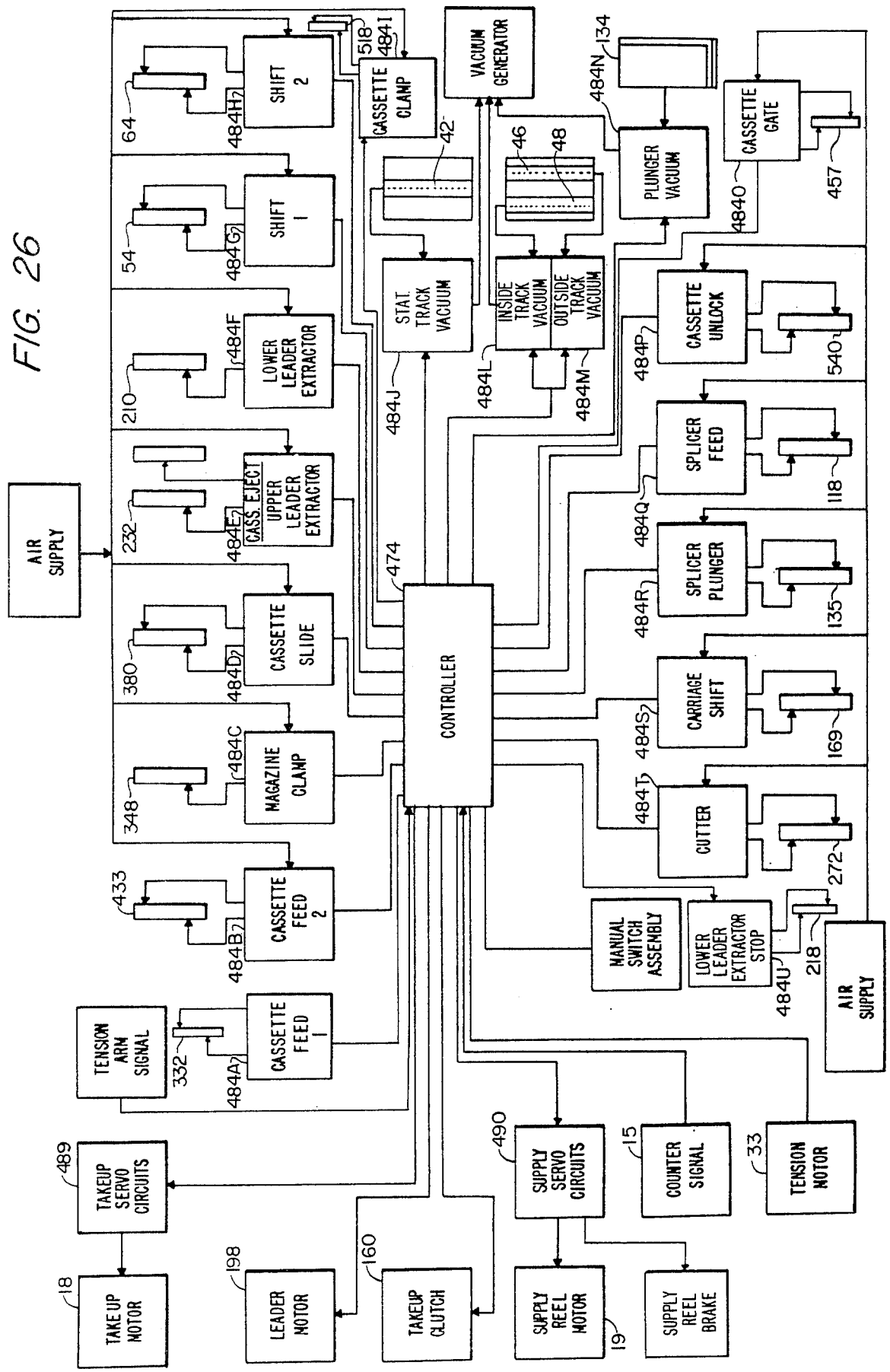
FIG. 26 is a schematic diagram of the control system for the machine of FIG. 1.

FIG. 26 shows schematically the control system for the machine. The control system employs a microprocessor based programmable controller 474 for controlling the operating sequence of the motors 18, 19 and 198 and a plurality of solenoid operated valves that control application of pressurized air to the several actuators and vacuum to the splicing block assembly and the plunger of splicer 6.

Various types of programmable controllers may be employed in practicing the present invention but a programmable microprocessor-based controller is preferred since it permits precise control of the timing of the operations which make up the operating cycle of the machine, and also is reliable and takes up relatively little space in the console.

FIG. 26 shows the actuators 54, 64, 118, 135, 169, 210, 218, 232, 272, 332, 336, 358, 400, 469, 457, 518, and 519 connected to a plurality of solenoid actuated control valves 484A–484R which control the application of air to the above-identified actuators and also for controlling application of vacuum to splicing block tracks 42, 46 and 48 and the plunger 134 of splicer 6. The air supply is typically an electrically powered air compressor (not shown) and the vacuum generator is typically a vacuum pump or a venturi-type vacuum device. The microprocessor based controller has signal lines connected to the solenoids of the aforesaid control valves and is programmed so as to cause the valves to apply pressurized air or vacuum to the various components in the sequence required to permit the machine to operate in the manner hereinafter described. The controller is connected to motors 18 and 19 and the brake of motor 19 via servo circuits 489 and 490 as shown which control operation of the motors and brake in response to signals from the controller. The controller also is connected to leader motor 198, clutch 160 and tension motor 33 so as to control their operation and also is connected to receive the signal outputs of potentiometer 21 and the footage counting transducer 15. Additionally, as shown in FIG. 1, the machine includes a plurality of manually operated switches 492 which are connected to controller 474 and are arranged so as to selectively cause the controller to cause the machine to accomplish specific operations, e.g., automatic loading of cassettes or individual testing of specific functions, e.g., splicing, cutting, shifting of splicing block 24, movement of splicing block support 26, etc.

Controller 474 is programmed to cause the machine to operate automatically in the manner hereinafter described. For this purpose the controller is programmed so as to cause supply reel motor 19 to run at a selected speed during winding of tape and to accelerate and decellerate smoothly according to a predetermined function The controller also is programmed to control the speed of servomotor 18 in accordance with the tension signal output of potentiometer 21 so as to maintain a suitable constant tension on tape 8 as it is being unwound from the supply reel and loaded into a cassette The program of the controller also controls (1) operation of motor 198 so as to shift the leader in the manner hereinafter described, (2) energization of motor 33 whenever the machine is turned on, (3) actuation of clutch 160 when-ever motor 18 is turned on, and (4) the stopping of motors 18 and 19 and the actuation of the supply reel brake whenever the count of signals from the transducer 15 reaches a predetermined value representative of the length of tape required to be loaded into a cassette.

Operation of the machine shown in FIGS. 1-26 will now be described.

Figure 18:
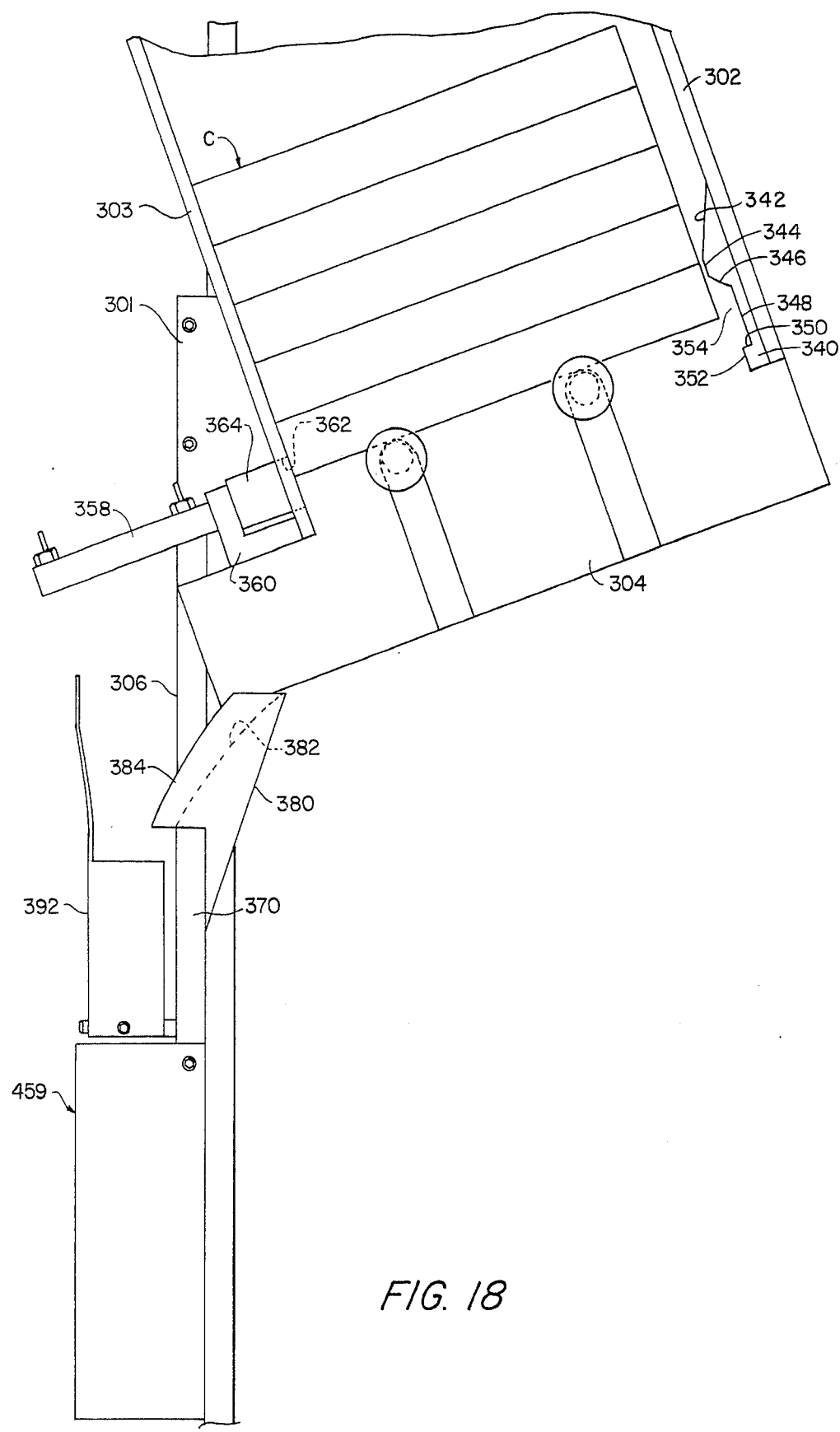

Assume that the machine motors 18, 19, 33 and 198 are off and the brake of motor 19 is on, no cassettes are in the magazine, cassette clamp arm 514 is relaxed, cassette support rods 320 are in their top limit position, the splicing block assembly is in the position shown in FIG. 9 so that the support 26 is flush with front panel 4 and tape tracks 42 and 46 are aligned with one another, vacuum is being applied to tape tracks 42, 46 and 48, cassette carrier 392 is in the position shown in FIG. 1, and gate 484 is in down position. Assume also that a reel of blank magnetic tape 8 to be loaded into a cassette is attached to supply hub 7 and that the magnetic tape extends from the supply reel to the track 48 via idler rolls 10, counter wheel 11, and idler 12. Assume also that the leading end of the magnetic tape in track 48 has been previously cut square by operation of the cutter mechanism and is flush with the end of the track 48 adjacent the gap 290. Now a plurality of VHS cassettes is loaded into the magazine 300 so as to rest on rods 320 (FIG. 18). The cassettes are stacked one on the other in the magazine with the top of each cassette facing up.

Operation of the machine is now initiated.

Figure 19:
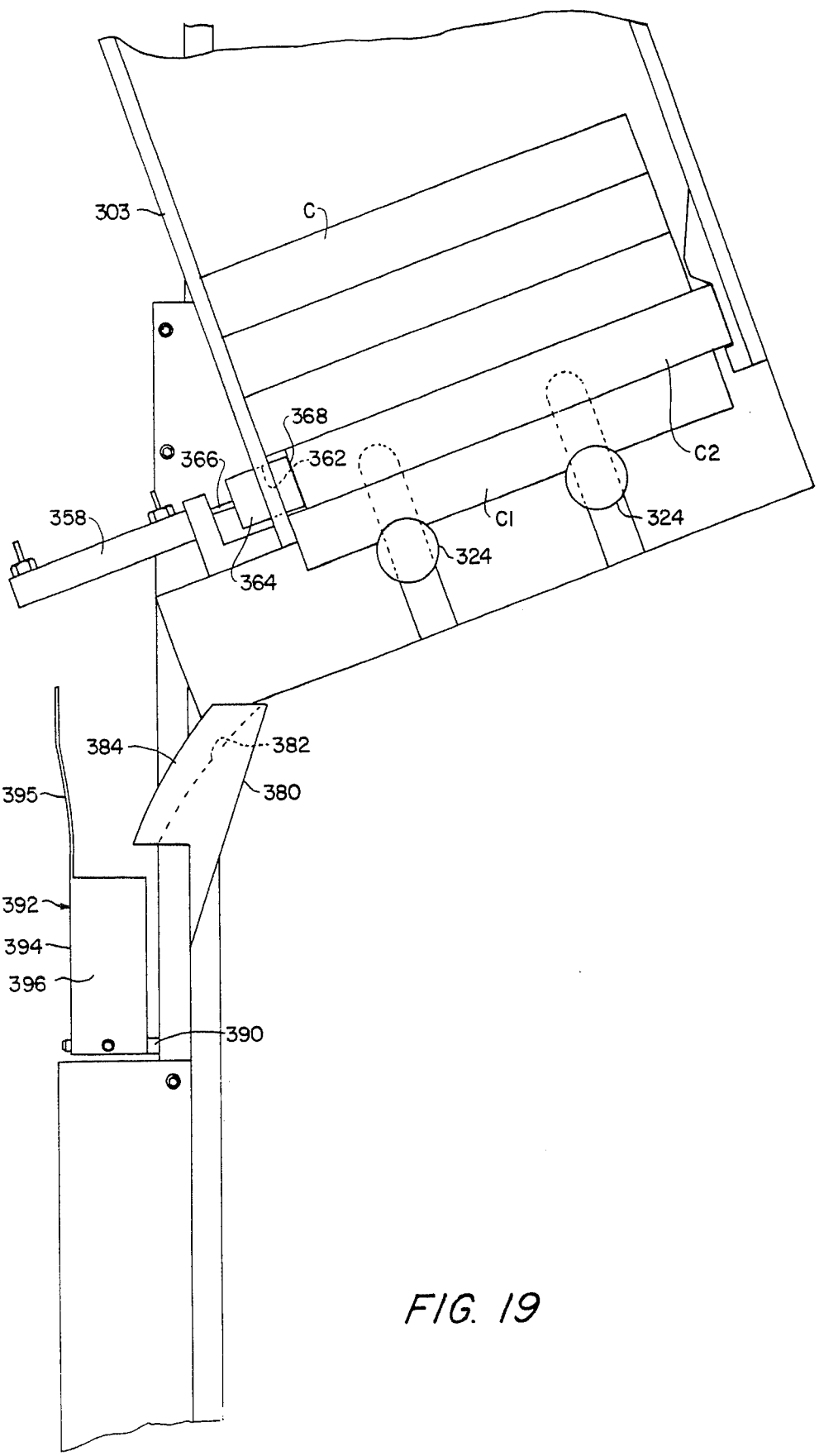
Figure 20:
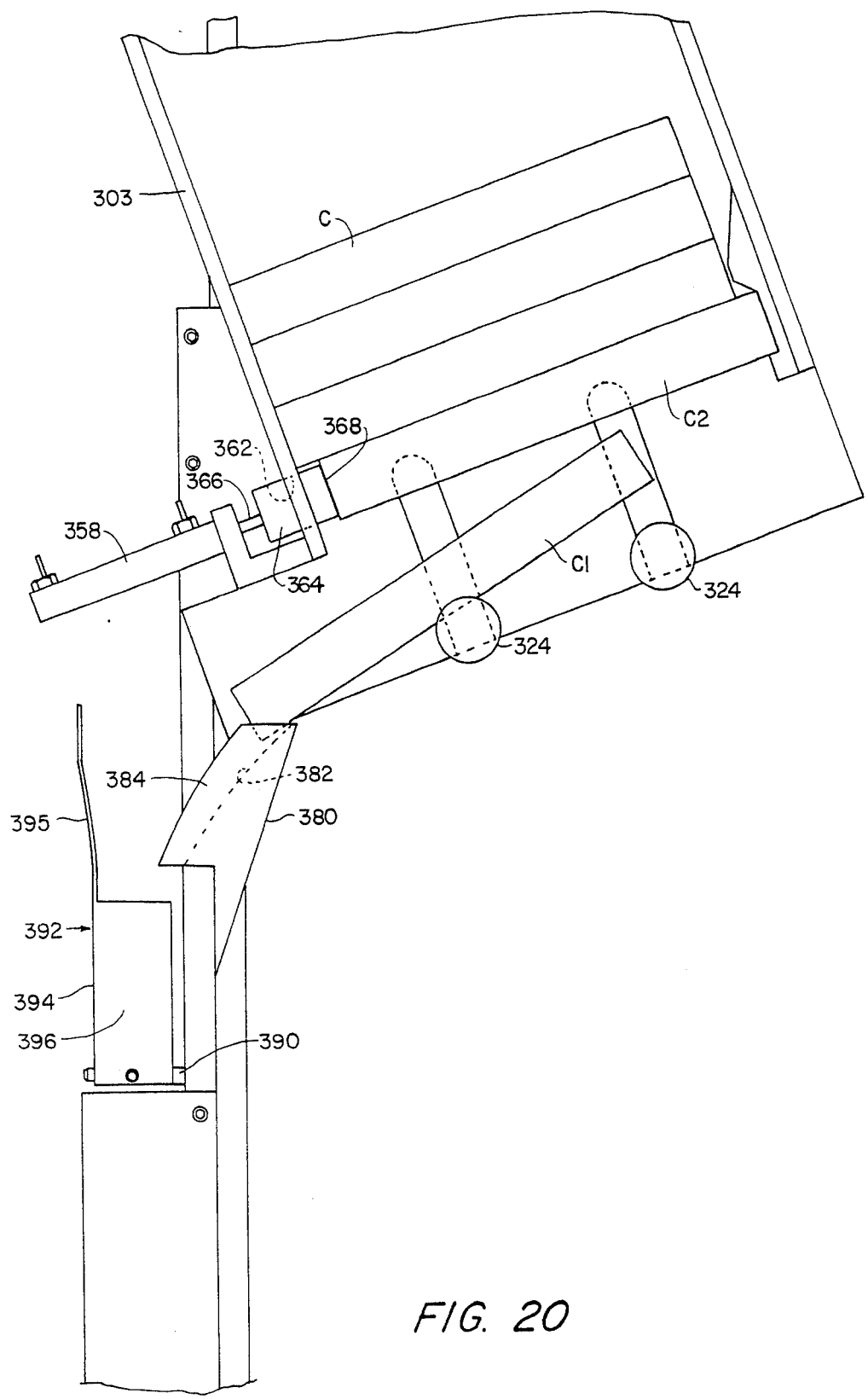
Figure 21:
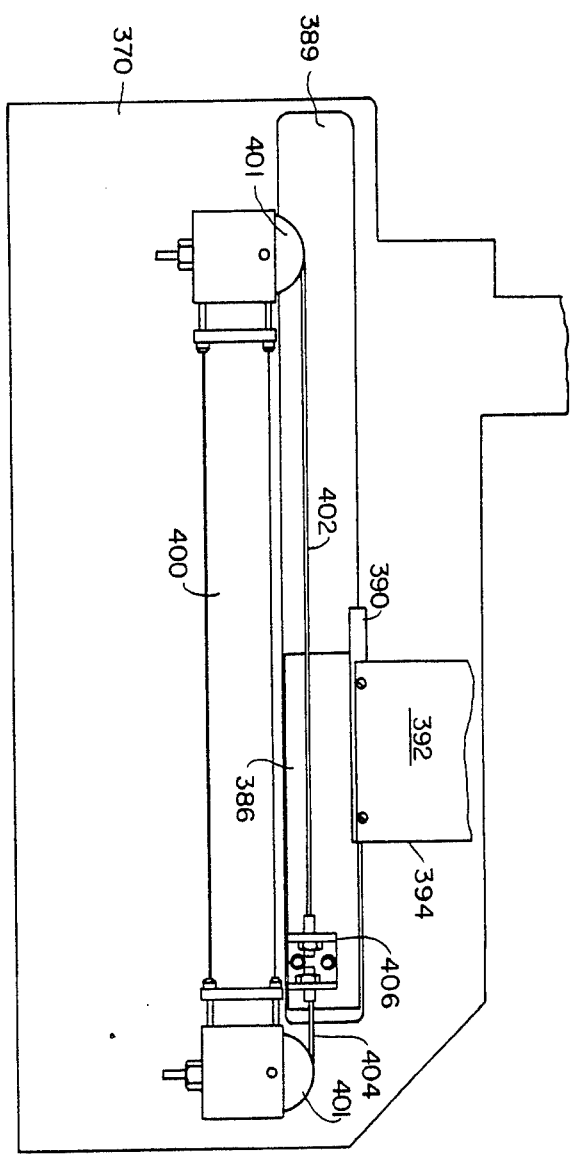
FIG. 21 is a fragmentary front elevation showing details of the mechanism for moving the cassette carrier.

Immediately controller 474 will cause motor 33 to be energized and draw tension arm 13 toward the right hand end of slot 37 (as seen in FIG. 1). At the same time the controller will cause actuator 332 to move rods 320 down to their intermediate position (FIG. 19) which is the thickness of one cassette below groove 354 and then actuator 358 is operated to clamp the second cassette C2 to clamp block 340 as shown in FIG. 19. Then the controller will cause actuator 336 to lower rods 320 down to their lower limit position so as to free the first cassette C1. The latter slides laterally off of rods 320 onto guide 380 and is guided by that guide and portion 395 down into the cassette carrier 392.

Thereafter, the rods 320 are returned to their upper limit position. However, as or just before the rods again reach the intermediate position shown in FIG. 19, clamp actuator 358 is operated to withdraw plunger 362 from the magazine thereby allowing the second cassette C2 to be moved up again by rods 320. The rods remain in their upper limit position until another cassette is to be loaded.

After a C-Zero cassette has been deposited in carrier 392, actuator 400 is operated so as to cause the carrier to convey that cassette to the loading position. As the carrier moves toward the splicing block assembly, the cassette will engage balls 416. The latter will press the cassette against front wall 394 and also will tend to force the cassette to bear against side wall 396. When slide 386 reaches the left hand end of slot 389, actuator 518 will be operated so as to cause arm 514 to clamp the cassette tight against plate 370. Immediately actuator 519 will be operated so that its tapered end 521 will engage and depress unlocking pin 461 of the cassette so as to unlock its door 447. The carrier then moves back to its at-rest position (FIG. 1) to await cassette C2 from the magazine.

With the first cassette now in loading position and its door unlocked due to pin 461 being depressed by member 521, the controller will cause drive motor carriage 16 to move forward far enough so that (a) pin 194 will engage the back surface 433 of the first cassette, (b) locator pins 190 and 192 will enter the locator holes 463 and 464 of the first cassette and thereby hold it against lateral movement, (c) pin 195 will enter the hole 465 to unlock the two hubs 467 and 468, (d) arm 204 will engage the edge of the front wall 452 of door 447 so as to cause the latter to open wide enough to allow its leader tape (shown in phantom at 449 in FIG. 25) to be withdrawn as hereinafter described, (e) drive spindles 20 and 200 enter the depressions 469 in upper and lower hubs 467 and 468 respectively, (f) and leader extractor pins 216 and 244 enter the edges slots 471 and 473 of the cassette behind leader tape 449. At this point the front side of the first cassette is restrained by clamp arm 514 while at its back side it is restrained by the end surface of pin 194 and the shoulders 193 of pins 190 and 192. When the cassette is engaged by pins 190, 192, and 194, it will be forced away from plate 370 a slight amount and its loading position will be determined by the those pins.

Thereafter controller 474 causes motor 198 to be energized so as to unwind the leader from hub 468 and wind it onto hub 467. Motor 198 is on just long enough to unwind as much leader as possible without detaching it from hub 468. Then controller 474 causes actuators 210 and 232 of the two leader extractor assemblies to be operated so as to cause their piston rods to be extended, whereby extractor pins 216 and 244 will (a) engage the leader 449, (b) withdraw it from the cassette and (c) place it in tracks 42 and 46. Then motor 198 is again operated briefly and, since at this time vacuum is being applied to all of the tracks of the splicing block assembly, the tension caused by motor 198 will cause the withdrawn leader 449 to be drawn tight in tracks 42 and 46 to improve the suction effect of the vacuum. The leading end of tape 8 will likewise be held by suction in track 48. Once the leader has been placed in tracks 42 and 44, the controller causes leader extractor pins 216 and 244 to be returned to their normal position and also causes cutter actuator 272 to be operated so that the knife blade 282 will reciprocate forwardly and backwardly through gap 290 to cut the leader tape into two sections. As soon as the cutter blade has been retracted to its normal at-rest position, controller 474 causes actuator 54 to rotate movable splicing block 24 so as to align the magnetic tape in track 48 with the leader section in track 42 (FIG. 5). Then controller 474 causes actuator 64 to pivot plate 26 to the position shown in FIGS. 7 and 9 so as to place tracks 42 and 48 in alignment with plunger 134 of splicer 6. The controller then causes splicer actuator 135 to be operated so as to cause a length of splicing tape to be cut and pressed over the abutting ends of the leader and magnetic tape. As soon as the plunger of the splicer has retracted to its normal at-rest position, the controller 474 causes actuator 64 to swing plate 26 swing back to its original flush position (FIG. 5), thereby placing the tracks 48 and 42 in a plane which extends at a right angle to panel 4 and is parallel to a plane through the axes of spindles 20 and 200 (FIGS. 5 and 6). As soon as the splicing block assembly reaches this parallel position, the controller operated through the appropriate connected valves to (a) interrupt the vacuum connection to tracks 42 and 48, (b) cause blocking actuator 218 to extend its piston rod in bore 220, (c) cause the lower leader extractor to extend leader extractor pin support 214 to the extent permitted by the extended piston rod of actuator 18, (d) cause clutch 160 to be actuated, (e) turn on servomotors 18 and 19 and release the supply reel brake, so as to accomplish winding of tape onto the hub 468 of the first cassette. The partially extended position of pin support 214 causes extractor pin 216 to function as a guide roller for the tape being wound so as to control the angle at which the tape enters the cassette This helps avoid damage to the tape and allows it to be wound into the cassette at a relatively high speed.

After a predetermined amount of magnetic tape has been wound into the cassette, as determined by the output from counter transducer 15, controller 474 causes (a) servomotors 18 and 19 to be turned off and the brake of motor 19 to be turned on and (b) vacuum to be reapplied to the inside track 48 of splicing block 24 and track 42, whereby the feeding of tape is stopped and tension is created in the supply tape between the splicing block and the supply reel. Then the controller first causes actuator 218 to retract its piston rod and then it causes the lower leader extractor pin 216 to be fully extended briefly so as to make certain that the magnetic tape is seated in the tracks 42 and 48 and a loop is created in the tape to facilitate shifting of the splicing block. Then controller causes the cutter mechanism to again operate to sever the magnetic tape. Thereafter, the controller causes splicing block 24 to be rotated to place the second leader section in track 46 in alignment with the tape in track 42 (FIG. 9). Then the controller causes actuator 64 to again pivot plate 26 to the position shown in FIG. 7. Next the controller causes splicer 6 to apply a piece of splicing tape to the abutting ends of the second leader section and the end of the magnetic tape wound into the cassette. Once this has been done, controller 474 causes actuator 64 to rotate plate 26 again to place track 42 into a plane extending at a right angle to panel 4 and parallel to the axes of spindles 20 and 200. Then the controller causes the vacuum to tracks 42 and 46 to be turned off and takeup motor 18 is again turned on briefly so as to wind the trailing end of the magnetic tape and the second leader section into the cassette.

Then controller 474 causes motor 18 to stop and carriage 16 to be retracted so as to free the motor spindles 20 and 200, the several locator pins and the leader extractor pins from the cassette. At this time the controller causes actuator 400 to start advancing the cassette carrier with a new cassette (the cassette C2 shown in FIG. 20) toward the splicing block assembly in the manner previously described. As the carriage 16 is withdrawn, the cassette door 447 is free to close under its operating spring bias. As soon as the carriage has retracted free of the loaded cassette, the controller will cause actuator 518 to release clamp arm 514, thereby allowing the loaded cassette to be discharged by gravity from the machine down onto platform 470 via guide chute 461. Before the loaded cassette is released and preferably around the time that the magnetic tape is spliced to the first leader section of cassette C1, the controller causes actuators 332, 336 and 358 to again operate in the manner previously described so as to discharge cassette C2 from the magazine into the carrier 392. Then, commencing with clamping of the cassette C2 by arm 514, the operations above-described are then repeated to load tape into that second cassette and to discharge that cassette after it has been loaded onto platform 470. At the time that the upper leader extractor is extended to place the extracted leader in tracks 42 and 46, actuator 469 is operated to extend the eject disk 462 so as to shove the loaded cassette previously deposited on platform 470 toward the side plate 472.

Gate 484 remains in its up position until ten cassettes have accumulated on platform 470. After the tenth loaded cassette has been deposited on the platform, the next operation of eject disk 462 will force the cassettes against switch 473, whereupon actuator 457 will be operated to lower the gate so as to allow the ten loaded cassettes to slide by gravity down onto tray 490. Tray 490 may then be removed and replaced by another empty tray.

Figure 27:
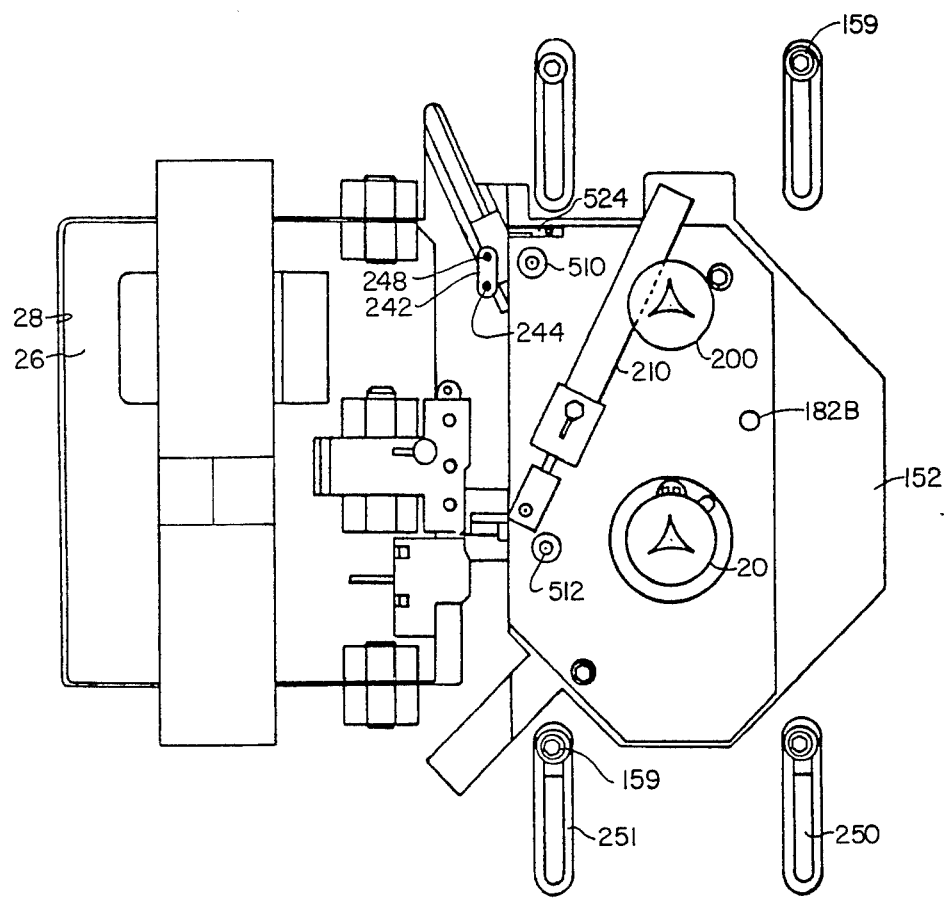
FIG. 27 is a view like FIG. 2 showing the Betamax adaptor plate.

In the event that it is desired to load magnetic tape into Betamax type cassettes, the machine is subjected to a mechanical changeover which adapts it for the handling of Betamax cassettes. This change-over involves modifying the upper leader extractor assembly by releasing the screw 248 and pivoting the short bar 242 so that its leader extractor pin 244 is in the down position shown in FIG. 27. The changeover also requires the takeup motor carriage 16 to be shifted by releasing the screws 159, moving the carriage assembly up for the full length of the holes 250, and then retightening screws 159.

The changeover for loading Betamax cassettes further involves replacing the block 340 with a block 340A which is actually identical except that it is thicker due to the shorter length of the Betamax cassette. Cassette carrier 392 is modified by replacing carrier walls 394 and 396 with a second arrangement comprising walls 394B, 396B and a bottom wall 397 (FIGS. 17,19 and 22A-C). Front wall 394 is bent as shown at 395B to facilitate entry of a cassette into the carrier. Walls 394B and 396B are attached by screws to carriage 390 and bottom wall 397 is spaced above the carriage so as to accommodate for the shorter length of the Betamax cassette. Also wall 396B is offset from the plane previously occupied by wall 396 due to the narrower dimension of the Betamax cassette. This is achieved providing wall 396B with an angulated tab 399 which is secured to carriage 390 by screws. Bottom wall 397 supports a Betamax cassette at the proper height to place it in cassette loading position.

The Betamax carrier also includes a different means for unlocking the cassette door as hereinafter described.

Except for the manner in which the cassette door is unlocked, operation of the machine when loading Betamax cassettes is substantially the same as when loading VHS cassettes.

Attention is drawn to FIGS. 29 and 30 which illustrate a Betamax cassette. In this case the cassette does not have a separate hub locking mechanism. Instead it has a hub locking mechanism (not shown) which is unlocked at the same time that the cassette door or cover is unlocked. The Betamax type cassette 500 has a spring-biased pivoted door 502 which has a small aperture 504 at one side which receives a spring-biased latch pin 506 which extends through a hole in the side of the body adjacent the hinge pivot for the cover. When pin 506 is depressed so as to move it out of aperture 504, the door is free to be opened and at the same time the two cassette hubs are unlocked for rotation.

Accordingly, adaptor plate 182B for the Betamax cassette has two locator pins 510 and 512 which are identical to locator pins 190 and 192 and which enter apertures 514 and 516 in the rear end of the cassette. It also has a flat ended pin corresponding to pin 194 to help support a cassette. The motor spindles 20 and 200 are adapted to fit into the recesses 518 in the rear of the two cassette hubs 520 and 522 and engage the teeth 524. Additionally, the adaptor plate has a small arm 524 similar to the arm 204 for pushing the door open. Arm 524 is shaped and located so that it may engage the rear edge of the front wall 503 of the door 502 near the end opposite to the end having aperture 504 when the carriage 16 is moved to its forward position.

The latch pin 506 is part of a pivoted latch member 528 which is situated in the recess in the cassette body. Latch member 528 is located behind an aperture 530 in the front end of the cassette. The cassette door is unlocked by engaging member 528 via aperture 530 and pressing it inward far enough to free pin 506 from the cover, whereby the cover may be opened by arm 524.

As seen in FIGS. 22A-C, the modified carrier 392B has a small hole 530 in its bottom wall 397, and attached to the underside of the bottom wall is a leaf spring 532 which has a conically shaped pin 534 at its free end. Pin 534 projects through hole 530 and is located so that when a Betamax cassette is discharged from the magazine into the carrier, the pin will be positioned directly under the aperture 504. As soon as a Betamax cassette drops into the carrier, pin 534 will engage latch pin 506 and press it into the cassette far enough to unlock the cassette door 502. The leaf spring will be biased downward under the weight of the cassette but pin 534 will still keep the door unlocked. Accordingly, when subsequently the cassette is placed in loading position and controller 474 causes the takeup motor carriage 16 to move forward, arm 524 will engage the door and cause the latter to pivot outwardly to expose leader 449. When loading of a Betamax cassette has been completed, carriage 16 is moved rearwardly as previously described, whereupon the door of the cassette will close automatically under its spring bias.

The primary advantage of this invention is that it provides an improved means for storing cassettes to be loaded in a magazine and feeding them one at a time to a predetermined loading position quickly and without damaging the cassettes. Another primary advantage is that it facilitates the handling of cassettes and the winding of tape, thereby permitting the machine to load video cassettes in less time than is required with prior machines.

Obviously the invention may be practiced otherwise than as described above. Thus, for example, magazine 300 may be constructed otherwise than as described. Plate 26 may be pivoted by actuator 64 simultaneously with or before or after splicing block 24 is pivoted by actuator 54. A different splicer or cassette feeder mechanism or a different tape cutter mechanism may be employed without departing from the essence of the invention. Moreover, if it is desired to dedicate the machine so that it will load only one type of cassette, the adaptor plate may be omitted and the leader motor 198, the lower leader extractor and the locator and door opening pins may be mounted directly to the carriage plate 152. Additionally the machine may be modified so as to handle a tape with a different width or a different kind of tape. Still other changes will be obvious to persons skilled in the art.

What is claimed is:

1. A machine for loading a use tape into a C-Zero cassette having:
    a cassette-storing magazine for storing C-Zero cassettes to be loaded with tape, said magazine having a bottom discharge opening; and
    a cassette-handling mechansim for (a) feeding C-Zero cassettes from said magazine to a selected loading position one at a time, (b) holding a cassette in said loading position, and (c) discharging a cassette from said loading position after said cassette has been loaded with a use tape;
    wherein said cassette-handling mechanism is characterized by:
    a movable cassette support means for supporting a stack of cassettes in said magazine;
    a movable clamp means for releasably clamping the next-to-lowest cassette in said stack in said magazine at a selected point;
    first actuating means for operating said clamp means;
    a conveyor for transporting C-Zero cassettes discharged from said magazine to said selected loading position;
    guide means for directing cassettes discharged from said magazine onto said conveyor;
    second actuating means for moving said movable cassette support means lengthwise of said magazine through a first top position, a second intermediate position and a third bottom position, said first position being above said selected point, said second position being below but close to said selected point, and said third position being substantially below both said selected point and said bottom discharge opening; and
    means for operating said first and second actuating means so that (1) a stack of cassettes in said magazine will be supported by said cassette support means at said first position, (2) said cassette support means will move said stack downward to said second position, (3) said clamp means will clamp the next-to-lowest cassette in said stack, (4) said cassette support means will lower the lowermost cassette in said stack to said third position whereby said lowermost cassette will be released to said conveyor via said guide means, (5) said cassette support means will engage said next-to-lowest cassette and will raise said next-to-lowest cassette to said first position, and (6) said clamp means will release said next-to-lowest cassette as or before said next-to-lowest cassette is engaged by said movable cassette support means so that said next-to-lowest cassette may be raised by said cassette support means up to said first position, and thereafter repeating steps (2) and (6);
    whereby cassettes will be released one at a time from said magazine to said conveyor.

2. A machine according to claim 1 wherein said guide means comprises a chute positioned below said magazine.

3. A machine according to claim 1 wherein said cassette support means comprises at least one cassette support member and means for reciprocating said at least one cassette support member lengthwise of said magazine.

4. A machine according to claim 1 wherein said second actuating means comprises first and second actuators, means mounting said first actuator, means connecting said first actuator to said second actuator so that said second actuator moves as said first actuator is operated, and said cassette support means is attached to said second actuator so that said cassette support means will move lengthwise of said magazine when either said first or second actuator is operated.

5. A machine according to claim 4 wherein said actuating means comprises at least one actuator of the type having a cylinder, a piston/piston rod assembly movable relative to said cylinder, and means for introducing a pressurized fluid to said cylinder so as to cause movement of said piston/piston rod assembly relative to said cylinder.

6. A machine according to claim 4 wherein each of said actuators comprises a cylinder, a piston/piston rod rod assembly movable relative to said cylinder, and means for introducing a pressurized fluid to said cylinder so as to cause movement of said piston/piston rod assembly relative to said cylinder.

7. A machine according to claim 1 wherein each cassette comprises a cassette body having oppositely disposed front and back walls and oppositely disposed first and second end walls, a door pivotally mounted to said end walls, and two hubs rotatably mounted in said cassette body with one side of said hubs exposed in openings in said back wall, and further wherein said magazine is arranged so that cassettes are stacked therein with the front wall of one cassette being engaged by the back wall of the next higher cassette.

8. A machine in accordance with claim 7 wherein said magazine is tilted so that cassettes stored in the magazine will have their second end walls at a higher level than their first end walls, and said guide means is located so that as each cassette is discharged from the magazine it will be directed to said conveyor with its said first end wall leading and its said second end wall trailing.

9. A machine in accordance with claim 1 having a front panel and a splicing block assembly and a splicer mounted to said first panel, and said conveyor is movable parallel to said front panel and said magazine is mounted so that each cassette discharged from the magazine drops along a path in a plane at a right angle to said panel as it is guided by said guide means to said conveyor.

10. A machine according to claim 1 having a front panel and a splicing block assembly mounted in front of said front panel, and
further including a second clamp means for holding a cassette to be loaded in said selected loading position, said second clamp means including a clamping member, means movably holding said clamping member in front of said front panel at said selected loading position, and means for moving said clamping member into clamping relationship with a cassette in said selected loading position.

11. A machine according to claim 10 further including a bracket on said front panel, and means pivotally mounting said clamping member to said front panel.

12. A machine according to claim 10 wherein said conveyor comprises a cassette carrier adapted to move a cassette released from said magazine to said selected loading position, and means for reciprocating said cassette carrier from a first position wherein said cassette carrier is disposed to receive a cassette discharged from said magazine and a second position wherein said cassette carrier is disposed to place a cassette so that it may be clamped in said selected loading position by said second clamp means.

13. A machine according to claim 1 wherein said machine comprises a console having a front panel and opposite side walls, and means mounting said magazine to one of said side walls.

14. A machine according to claim 1 wherein said machine comprises a console having a front panel, and further includes a first and second spindles engageable with the two hubs of a cassette located in said selected loading position, first motor means for driving said first spindle in a selected direction on command, and second motor means for driving said second spindle in a selected direction on command.

15. A machine according to claim 14 further including a clutch coupling said first spindle and said first motor means, said clutch normally being dis-engaged so that said first spindle is free-wheeling relative to said first motor means.

16. A machine according to claim 14 further including means for simultaneously energizing said first motor means and engaging said clutch.

17. A machine according to claim 14 further including means for energizing said second motor means while said first motor means is de-energized and said clutch is disengaged.

18. A machine according to claim 17 further including a front panel and a carriage movable toward and away from said front panel between a first limit position proximate to said front panel and a second limit position remote from said front panel, means mounting said first and second motor means to said carriage so that said motor means and said spindles will move as a unit toward and away from said front panel, and further including means for energizing said first or second motor means only when said carriage is in said first limit position.

19. A machine according to claim 1 further including a splicing block assembly for supporting a use tape to be loaded and a leader tape attached to the two hubs of a C-Zero cassette to be loaded, said splicing block assembly comprising:
  a splicing block support;
  a first splicing block having a first guideway for receiving a first tape, said first block being affixed to said support for movement therewith;
  a second splicing block having second and third parallel guideways for receiving second and third tapes;
  means mounting said second block to said support for rotation on a first axis extending parallel to said second and third guideways;
  means mounting said support for pivotal movement about a second axis extending parallel to said first axis;
  means for rotating said second block on said first axis between a first position in which said first and second guideways are aligned and a second position in which said first and third guideways are aligned; and
  means for pivoting said support about said second axis on command.

20. A machine according to claim 19 in combination with a tape cutter mechanism, said tape cutter mechanism comprising a cutter which reciprocates along an axis extending at a right angle to said panel.

21. A machine according to claim 20 further including a splicer for applying an adhesive splicing tape to the abutting ends of a use tape and a leader tape, and control means for operating all of the aforesaid means in a selected sequence so as to effect loading of use tape into a C-Zero cassette located at said selected loading station by a method which includes cutting said leader into first and second sections, splicing said use tape to said first leader, winding said first leader and a selected quantity of use tape into said cassette, cutting the use tape so as to provide a trailing end for use tape wound into said cassette, and splicing said trailing end to said second leader section.

22. A machine according to claim 19 wherein said panel has an opening therein and said support plate extends through said opening.

23. A machine according to claim 19 further including leader extractor means for extracting the leader from a cassette located in said loading position and placing the extracted leader in said first and second guideways.

24. A machine according to claim 1 for loading C-Zero cassettes of the type having (a) a door movable between a first closed position and a second open position and adapted to conceal its leader tape when it is in said first closed position and (b) releasable lock means for locking the door, said machine further comprising:
cassette door unlocking means for releasing the said lock means of a cassette located in said loading position,
means for selectively operating said cassette door unlocking means; and
door opening means for opening the unlocked door of a cassette located in said loading position.

25. A machine according to claim 24 wherein said cassette door unlocking means comprises a member attached to said conveyor.

26. A machine according to claim 25 wherein said conveyor is arranged to hold a cassette so that its door extends lengthwise transversely to the path of movement of the cassette as it moves from the magazine to the loading position, and said door unlocking means comprises a member which moves at a right angle to said path of movement.

27. A machine according to claim 1 further including a cassette-receiving chute located in position to receive each loaded cassette as it is discharged from said loading position, means for causing each loaded cassette to be deposited on said chute with the front and back walls of the cassette extending vertically, and means for retaining cassettes on said chute until a selected number of cassettes has accumulated thereon and then discharging said selected number by gravity.

28. A machine according to claim 27 further including means for shifting each newly deposited cassette laterally on said chute so as to make room for another loaded cassette discharged from said loading position.

29. A machine according to claim 1 for loading use tape into a cassette which has a top side and a bottom side, at least one cavity in said bottom side, a pair of rotatable hubs visable through apertures on said bottom side, and a door pivotable between a first closed position and a second open position, further including:
a console having a front panel;
means mounting said conveyor in front of said panel;
means mounting said cassette guide so that cassettes are deposited on said conveyor with said bottom side facing toward and said top side facing away from said front panel;
a carriage assembly comprising a carriage, at least one locator pin mounted to said carriage and extending parallel to said takeup spindle, a selectively energizable motor carried by said carriage, a takeup spindle coupled to said motor and extending perpendicularly to said panel, and a cassette door opening arm mounted to said carriage;
an opening in said front panel in line with said carriage;
means mounting said carriage behind said panel for movement between a first position in which said at least one locator pin, said takeup spindle and said cassette door opening arm are spaced from a cassette disposed in said selected loading position and a second position in which, in respect to a cassette located in loading position, said at least one locator pin will penetrate said at least one cavity in said bottom cassette side, said takeup spindle will engage one of the cassette hubs, and said door opening arm will push said door open;
means for moving said carriage from one to the other of said first and second positions on command;
a splicing block assembly for supporting a use tape to be loaded and a leader tape attached to the two hubs of a cassette to be loaded, said splicing block assembly comprising a first block having first and second tape guide means for supporting said leader tape, a second block having a third tape guide means for supporting a use tape, a block support plate for supporting said first and second blocks so that said first block may be moved relative to said second block between a first splicing position in which said first tape guide means is aligned with said third tape guide means and a second splicing position in which said second tape guide means is aligned with said third tape guide means, and means for effecting relative movement between said blocks so as to selectively place said first or second tape guide means in alignment with said third tape guide means; and
leader extractor means carried by said carriage, said leader extractor means comprising first and second movable leader extracting devices having means engageable with the leader of a cassette in said loading position and movable in predetermined directions away from said cassette so as to extract said leader and cause it to be positioned in said first and third guideways when said first splicing block is in said first splicing position.

30. Apparatus according to claim 29 wherein one of said leader extracting devices comprises a fluid operated actuator having a piston rod adapted to reciprocate according to how the actuator is pressurized, a shaft attached to one end of said rod, and a leader extracting pin rotatably mounted in said shaft and extending at a right angle to said front panel.

31. A machine according to claim 30 wherein said piston rod is movable between a first limit position which it occupies when the carriage is retracted away from said front panel and a second limit position which it occupies only after the door of a cassette in loading position has been opened; and
further including selectively operable means for holding said piston rod in an intermediate position during the time that tape is being wound into a cassette, whereby said rotatable leader extracting pin functions as a roller type guide for said tape.

32. A machine according to claim 30 further including cassette door unlocking means comprising a member movable parallel to the plane of said panel.

33. A machine according to claim 30 further including cassette door unlocking means carried by said carriage.

* * * * *